(12) United States Patent
Lehto et al.

(10) Patent No.: US 8,965,959 B2
(45) Date of Patent: *Feb. 24, 2015

(54) PROCESSING EVENT INSTANCE DATA IN A CLIENT-SERVER ARCHITECTURE

(75) Inventors: Teemu Lehto, Espoo (FI); Markku Hinkka, Espoo (FI)

(73) Assignee: OPR Software Oyi, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,076

(22) Filed: Mar. 30, 2012

(65) Prior Publication Data

US 2013/0212154 A1   Aug. 15, 2013

Related U.S. Application Data

(60) Provisional application No. 61/598,935, filed on Feb. 15, 2012.

(30) Foreign Application Priority Data

Feb. 15, 2012  (FI) ..................................... 20125169
Feb. 15, 2012  (FI) ..................................... 20125170
Feb. 15, 2012  (FI) ..................................... 20125173
Feb. 15, 2012  (FI) ..................................... 20125174
Feb. 15, 2012  (FI) ..................................... 20125176

(51) Int. Cl.
*G06F 15/16*    (2006.01)
*H04L 29/06*   (2006.01)
*G06Q 10/06*   (2012.01)
*G06Q 10/08*   (2012.01)

(52) U.S. Cl.
CPC ............ *H04L 67/42* (2013.01); *G06Q 10/0631* (2013.01); *G06Q 10/08* (2013.01)
USPC ......................................................... 709/203

(58) Field of Classification Search
CPC .... G06F 15/16; H04L 67/42; G06Q 10/0631; G06Q 10/08
USPC .................... 709/203, 206, 20, 224, 226, 220
See application file for complete search history.

(56) References Cited

U.S. PATENT DOCUMENTS

2012/0054201 A1*   3/2012   Fischer ......................... 707/748

* cited by examiner

*Primary Examiner* — Vivek Srivastava
*Assistant Examiner* — Normin Abedin
(74) *Attorney, Agent, or Firm* — Barnes & Thornburg LLP

(57) ABSTRACT

A process analysis system (1-300) processes event data describing real-world processes (1-100). The process analysis system performs the following acts: importing event instance data sets from an information management system (1-200), each set comprising one or more attributes describing an event instance in the real-world process (1-100); for each event instance, determining a corresponding process instance based on at least the attributes; determining event order attribute(s) for each imported event instance data set based on other event instance data sets corresponding to the same process instance; forming an analysis result set based on at least the event instance data sets and at least one first or second attribute; the client(s) presenting an analysis utilizing the analysis result set.

25 Claims, 20 Drawing Sheets

```
CREATE TABLE PA_EVENT (
  EVT_ID BIGINT IDENTITY NOT NULL,
  EVT_MODEL_ID BIGINT,              4-110
  EVT_CASE_ID BIGINT,               4-115
  EVT_ACTIVITY_ID BIGINT,
  EVT_START_TIME DATETIME,          4-120
  EVT_COST FLOAT                    4-125
);
```

(B)

4-200

```
CREATE TABLE #PA_EVENT_WITH_ORDER_5c09a8642d1a4cbbba00eca9b6f34390 (
  EVT_ID BIGINT,
  EVT_CASE_ID BIGINT,
  EVT_ACTIVITY_ID BIGINT,
  EVT_COST FLOAT,
  EVT_START_TIME DATETIME,
  EVT_ORDER BIGINT,
  EVT_ORDER_DESCENDING BIGINT
);
```

INSERT INTO #PA_EVENT_WITH_ORDER_5c09a8642d1a4cbbba00eca9b6f34390 (
  EVT_ID,
  EVT_CASE_ID,
  EVT_ACTIVITY_ID,
  EVT_COST,
  EVT_START_TIME,
  EVT_ORDER,
  EVT_ORDER_DESCENDING
)
SELECT
  EVT_ID,
  EVT_CASE_ID,
  EVT_ACTIVITY_ID,
  EVT_COST,
  EVT_START_TIME,                ← 4-120
  /* Ascending ordering */
  ROW_NUMBER() OVER(PARTITION BY EVT_CASE_ID ORDER BY
  EVT_START_TIME ASC, EVT_ID ASC) AS EVT_ORDER,              } 4-261
  /* Descending ordering */
  ROW_NUMBER() OVER(PARTITION BY EVT_CASE_ID ORDER BY
  EVT_START_TIME DESC, EVT_ID DESC) AS EVT_ORDER_DESCENDING  } 4-262
FROM
  PA_EVENT  ← 4-264
WHERE
  EVT_MODEL_ID = (SELECT VIEW_MODEL_ID FROM PA_VIEW WHERE VIE_ID = @viewId)
```

(D)

```
4-300

/* Create event cache table */
CREATE TABLE PA_CACHE_EVENT_ORDERED_196 (
  EVT_ID BIGINT,
  EVT_CASE_ID BIGINT,
  EVT_ACTIVITY_ID BIGINT,
  EVT_COST FLOAT,                       ← 4-120
  EVT_START_TIME DATETIME,
  EVT_ORDER BIGINT,                     ← 4-310
  EVT_NEXT_EVENT_ID BIGINT,             ← 4-320
  EVT_NEXT_ACTIVITY_ID BIGINT,
  EVT_NEXT_START_TIME DATETIME,         ← 4-330
  EVT_TRANSITION_ORDER BIGINT,
  EVT_TRANSITION_UNIQUE_DURATION FLOAT,
);
```

Fig. 4
4-350   (E)

```
INSERT INTO PA_CACHE_EVENT_ORDERED_196 (
  EVT_ID,
  EVT_CASE_ID,
  EVT_ACTIVITY_ID,
  EVT_COST,
  EVT_START_TIME,
  EVT_ORDER,
  EVT_NEXT_EVENT_ID,
  EVT_NEXT_ACTIVITY_ID,
  EVT_NEXT_START_TIME,
  EVT_TRANSITION_ORDER,
  EVT_TRANSITION_UNIQUE_DURATION
)
(
/* Normal case where next event exists. */
SELECT
  EO1.EVT_ID,                                  4-370
  EO1.EVT_CASE_ID,
  EO1.EVT_ACTIVITY_ID,
  EO1.EVT_COST,
  EO1.EVT_START_TIME,
  EO1.EVT_ORDER,
  EO2.EVT_ID AS EVT_NEXT_EVENT_ID,
  EO2.EVT_ACTIVITY_ID AS EVT_NEXT_ACTIVITY_ID,
  EO2.EVT_START_TIME AS EVT_NEXT_START_TIME,
  ROW_NUMBER() OVER ( PARTITION BY EO1.EVT_ACTIVITY_ID, EO2.EVT_ACTIVITY_ID,
    EO1.EVT_CASE_ID ORDER BY EO1.EVT_ORDER ASC) AS EVT_TRANSITION_ORDER,
  CAST(DATEDIFF(s, EO1.EVT_START_TIME, EO2.EVT_START_TIME) AS FLOAT) / (60 * 60 * 24) AS
    EVT_TRANSITION_UNIQUE_DURATION                                           4-372
FROM
  #PA_EVENT_WITH_ORDER_5c09a8642d1a4cbbba00eca9b6f34390 AS EO1 JOIN
  #PA_EVENT_WITH_ORDER_5c09a8642d1a4cbbba00eca9b6f34390 AS EO2
    ON EO1.EVT_ORDER = EO2.EVT_ORDER - 1 AND EO1.EVT_CASE_ID = EO2.EVT_CASE_ID
)
UNION            4-374                                          4-376
(
/* Next event doesn't exist for last events of cases. Use NULL values for those. */
SELECT
  EVT_ID,
  EVT_CASE_ID,
  EVT_ACTIVITY_ID,
  EVT_COST,
  EVT_START_TIME,
  EVT_ORDER,
  NULL,
  NULL,
  NULL,
  1,
  NULL
FROM
  #PA_EVENT_WITH_ORDER_5c09a8642d1a4cbbba00eca9b6f34390
WHERE
  EVT_ORDER_DESCENDING = 1
)
```

Fig. 5 (B)

```
Program title
Menu area
Tools
Object Explorer  | SQL Query #1 | SQL Query #2 | SQL Query #3
Connect          |
Object #1        | SELECT *
Object #2        | FROM (
Object #3, ...   |   SELECT
                 |     *,
                 |     ROW_NUMBER() OVER (PARTITION BY EVT_CASE_ID ORDER BY
                 |   EVT_START_TIME ASC) AS EVT_ORDER
                 |   FROM
                 |     PA_EVENT
                 | ) AS tmp
                 | WHERE
                 |   EVT_CASE_ID = 5 AND
                 |   tmp.EVT_ORDER = 2
```

5-170

Results | Messages | Execution plan

Icon/Descr.   Icon/Descr. for   Icon/Descr. for   Icon/Descr. for   Icon/Descr. for   Icon/Descr. for   Icon/Descr. for   Icon/Descr. for
for Step #1 — Step #2 — Step #3 — Step #4 — Step #5 — Step #6 — Step #7 — Step #8
                                                                                                                          └ Icon/Descr. for
                                                                                                                              Step #9

5-180

5-100

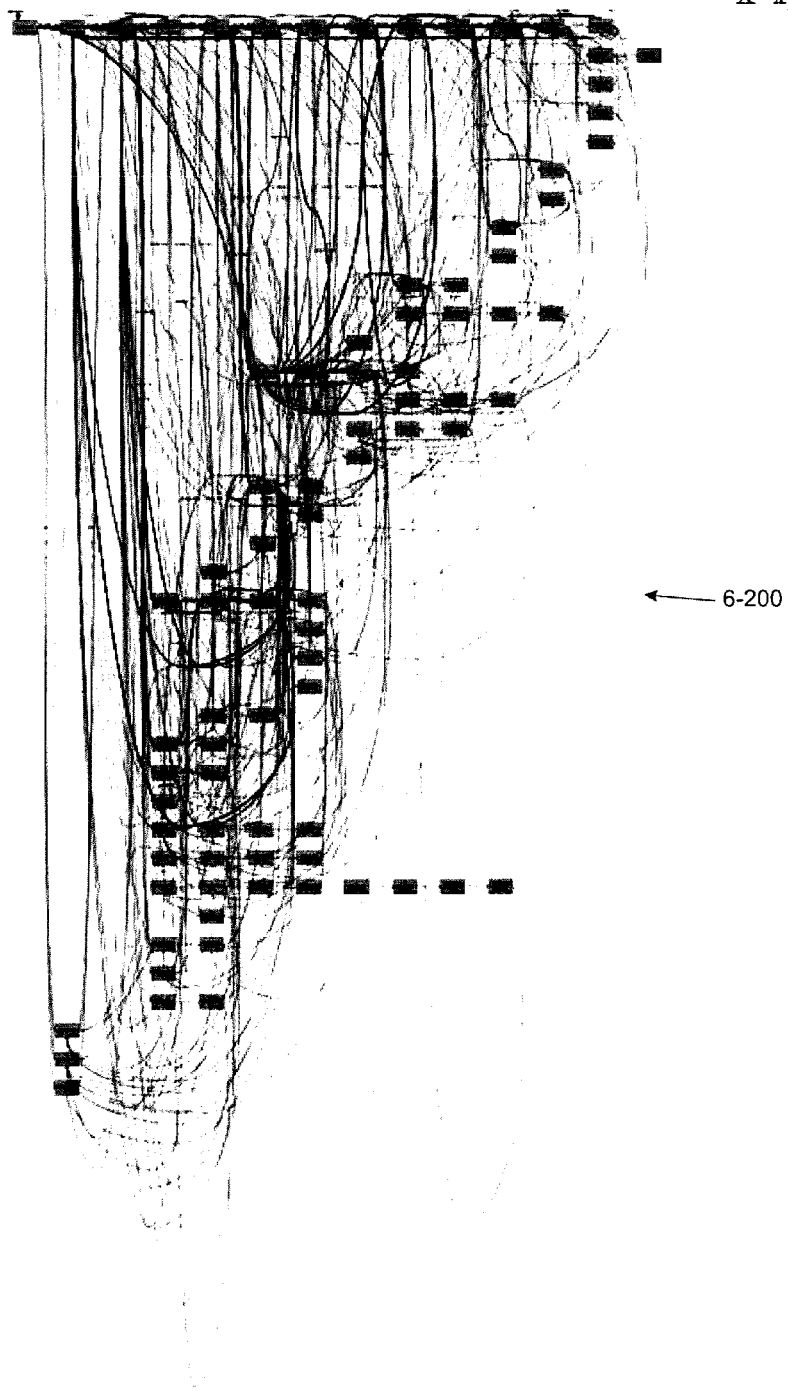

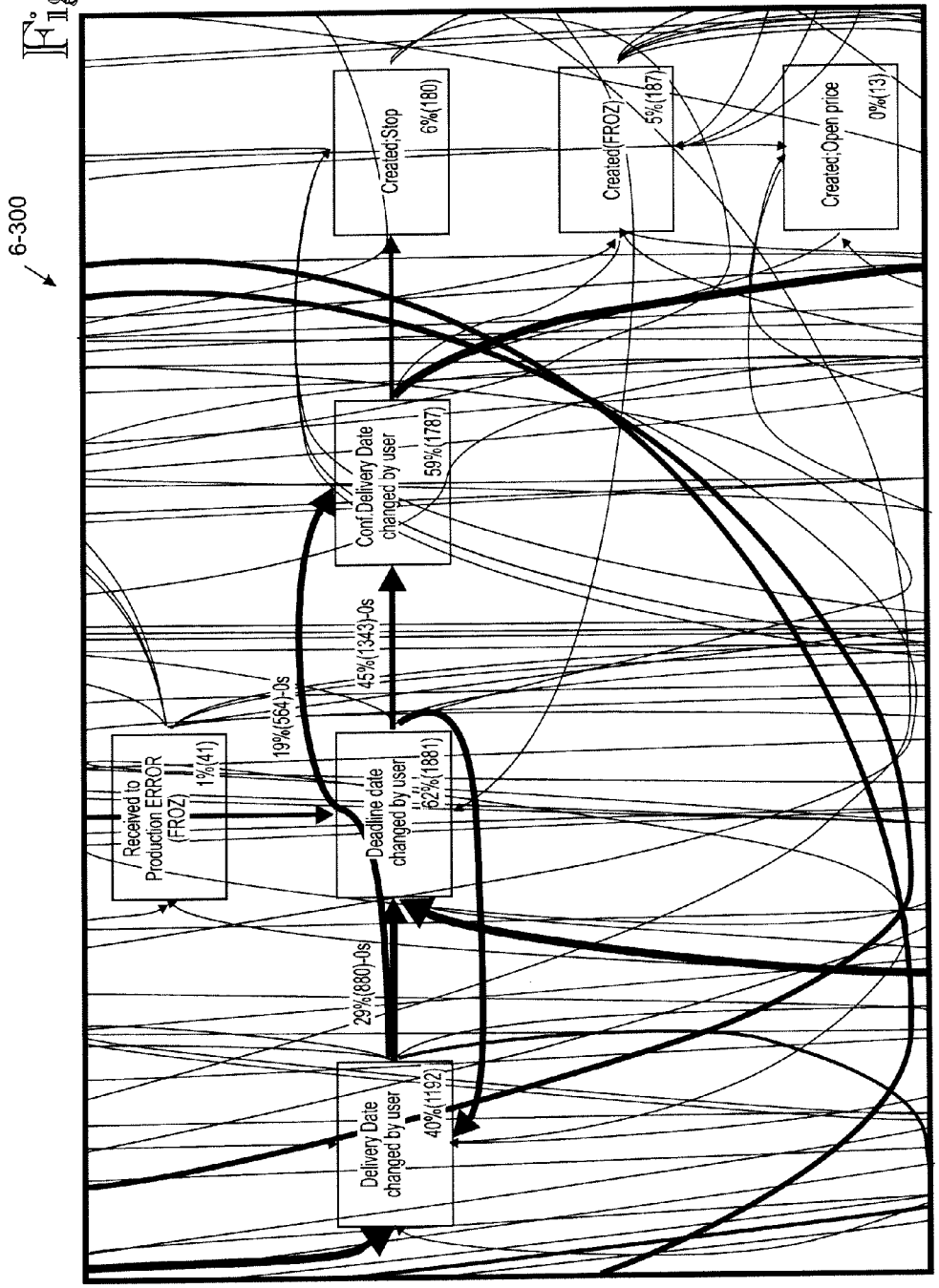

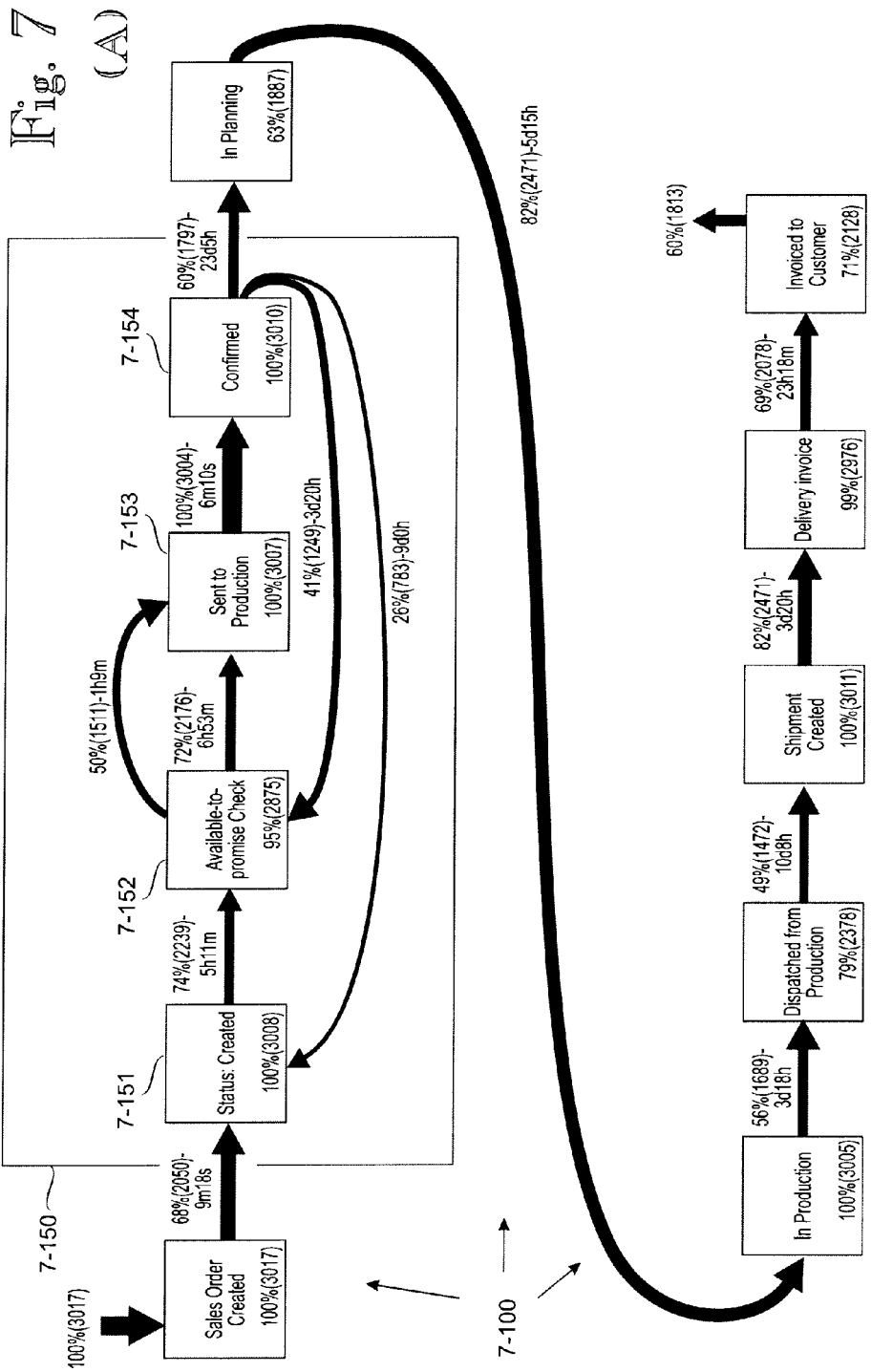

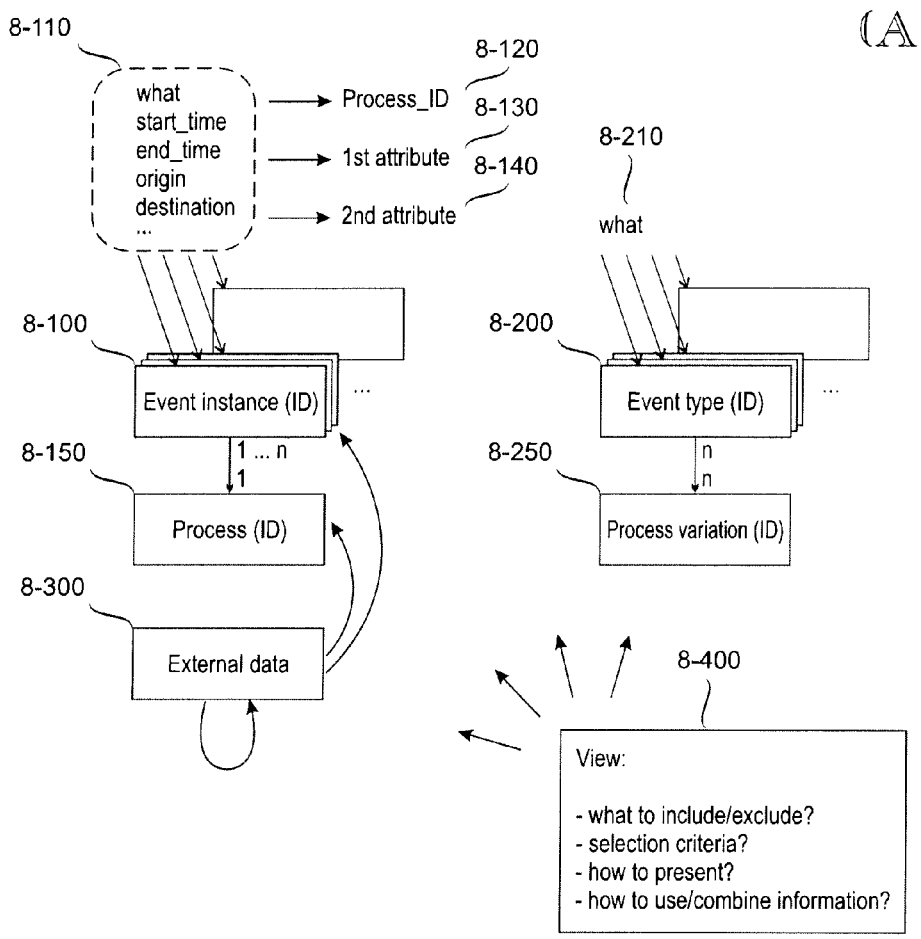
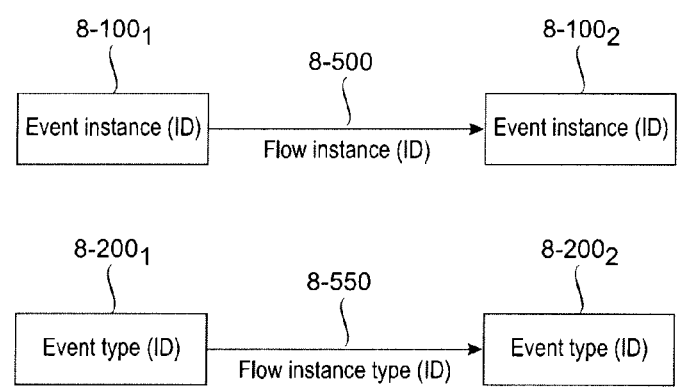
Fig. 8

```
CREATE TABLE PA_VARIATION (
  VAR_ID BIGINT IDENTITY NOT NULL,
  VAR_MODEL_ID BIGINT,
  VAR_HASH BIGINT,
  VAR_HASH_STRING NVARCHAR(MAX),
  VAR_TOTAL_ACTIVITY_COUNT INT,
  VAR_TOTAL_UNIQUE_ACTIVITY_COUNT INT
);
```

(B)
9-200

```
CREATE TABLE PA_CASE (
  CAS_ID BIGINT IDENTITY NOT NULL,
  CAS_MODEL_ID BIGINT,
  CAS_NAME NVARCHAR(450),
  CAS_START_TIME DATETIME,
  CAS_END_TIME DATETIME,
  CAS_DURATION FLOAT,
  CAS_EVENTS INT,
  CAS_VARIATION_ID BIGINT,
  CAS_COST FLOAT
);
```

(C)

- Collect all unique case identifiers for all the imported events. — 9-302
- Query list of event type identifiers "visited by" the case, sorted by the timestamp of the corresponding event. — 9-304
- Build an easily searchable representation of this event type (eg a textual path) — 9-306
- Does a process variation with an identical event type path exist? — 9-308
  - No → 9-310: Create a new variation and select it as the variation of the case.
  - Yes → 9-312: Select the existing variation as the variation of the case.
- Repeat until all cases processed — 9-314

(D)

(E)

```
SELECT
  TOP 1
  VAR_ID
FROM
  (
    SELECT
      VAR_ID,
      COUNT (DISTINCT CAS_ID) AS VAR_COUNT
    FROM
      PA_VARIATION
        LEFT OUTER JOIN PA_CASE ON
          CAS_VARIATION_ID = VAR_ID
    WHERE
      VAR_MODEL_ID = 1
    GROUP BY
      VAR_ID
  ) AS tmp
ORDER BY
  VAR_COUNT DESC
```

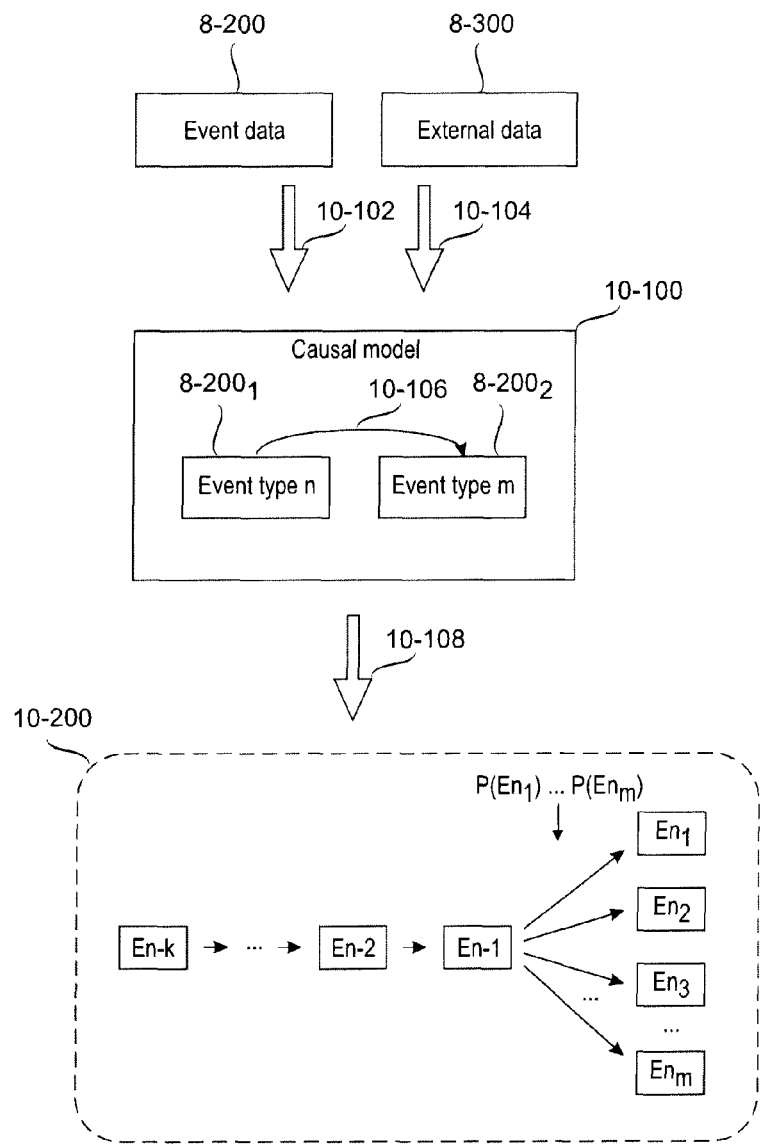

… # PROCESSING EVENT INSTANCE DATA IN A CLIENT-SERVER ARCHITECTURE

The present invention claims priority from commonly owned U.S. provisional patent application no 61/598,935 filed 15 Feb. 2012 and titled similarly to the present application. The present invention further claims priority and from five commonly owned Finnish patent applications 20125169, 20125176, 20125170, 20125173, 20125174, all of which have been filed on 15 Feb. 2012 and which have the same title as the present invention.

FIELD OF THE INVENTION

The present invention broadly relates to analysing of processes in which a large amount of events take place for a large amount of process instances. Such processes can be for example logistic processes where goods and/or information is transported between locations and the transportation of goods and/or information is being tracked for business-related purposes. A logic process comprises several steps, such as negotiations between customer and service provider (wherein "service" may comprise delivery of physical objects), bids, contracts, manufacturing (eg software and/or hardware), testing, packing, delivery, or the like. In a logistic process a computer system controls and monitors the logistic process in which hardware, software and/or service is negotiated between supplier and customer and delivered from supplier to customer. Another example of such processes are healthcare processes, where a large amount of events take place regarding the treatment process, for example: first aid, doctor visit, surgery and ward visit. Yet another example is a management process for a patent applications, in which several events are recorded for each application, such as "application written", "application filed", "USPTO request", "payment for patent", "patent granted". A still further example is a management process for sales processes, where events related to sales process are recorded into a CRM system. Yet another example is the help desk/service desk process, where events are recorded into Case management/service desk system. Yet another example is a human resource process, where for each employee of a company events like "recruited", "salary increased", "absence", "holiday", "promoted to supervisor", "course X taken", "employment terminates" are recorded into a HR system.

More particularly, the invention relates to computer-implemented methods and equipments for automated modelling of processes, in which a process analysis computer cannot be directly coupled to the underlying process that actually results in the delivery of hardware, software and/or service is delivered from supplier to customer.

BACKGROUND OF THE INVENTION

FIG. 1 shows an overall view of an environment wherein the invention can be utilized for a logistic process. The environment shown in FIG. 1 is intended to illustrate rather than restrict the invention. Reference numeral 1-100 denotes an exemplary logistic process in the real world. The logistic process 1-100 comprises various process steps, including real-world delivery of hardware, software and/or service from supplier to customer. In the context of the present invention, any business processes relating to the logistic process, such as negotiations, bidding or invoicing, are considered part of the logistic process 1-100. Reference numeral 1-200 denotes an information management system, which supports the logistic process 1-100. In an illustrative but non-restrictive example, the information management system, of which there may be more than one, comprises a resource-planning system. The acronym ERP stands for Enterprise Resource Planning, which term is frequently used in connection with logistic processes. The invention is not restricted to environments wherein the information management systems 1-200 meet a strict definition of ERP system, however. Reference numeral 1-300 generally denotes computer-implemented analysis tools or analysis system. It is generally known that computer-implemented analysis systems, such as the one denoted by reference numeral 1-300, can be used to analyse real-world processes, such the one denoted by reference numeral 1-100.

One of the problems associated with the environment relates to the fact that while it is generally desirable to analyse the efficiency of the logistic process 1-100 by computer-implemented analysis system 1-300, and thereby locate bottlenecks and problems spots in the logistic process 1-100, it is normally impossible to couple the computer-implemented analysis system 1-300, directly to the logistic process 1-100. In FIG. 1, this problem is illustrated by the fact that the arrow between the logistic process 1-100 and the computer-implemented analysis system 1-300 is broken. Obviously, there is a motivation to couple the computer-implemented analysis tools 1-300 with the logistic process 1-100 indirectly, via the ERP system 1-200. This indirect coupling, in turn, generates additional problems or questions, such as how to program the analysis system 1-300 to obtain data that is relevant to the problem of discovering bottlenecks and problem spots in the logistic process. For the purposes of the ERP system 1-200 it suffices that the various events in the logistic process 1-100 are recorded in the ERP system 1-200, but the ERP system 1-200 is not programmed to discover process bottlenecks. In fact, a typical ERP system 1-200 is ignorant of cause-effect or predecessor-successor relations between the events in the logistic process 1-100.

Another problem relates to the fact that the number of individual processes (process instances) in a typical ERP system is huge. Each open or completed order is an instance of a process that differs from all the other process instances at some level of detail. On the other hand, if all process instances are generalized to just the two end nodes (namely start and end), all process end up being the same. The question, then, is how to generalize processes such that classes of processes begin to emerge, wherein certain classes of processes tend to exhibit various problems, such as long processing times, convoluted process flows, or the like.

The question of discovering potentially problematic process classes is not merely a question of obtaining cognitive information. In addition, there is clearly technical problem of how to perform the process analysis (in the analysis system 1-300) with sufficient efficiency, such that interactive real-time analysis is possible. Let us assume, firstly, that all data describing the ERP process resides in the database of the ERP system 1-200 and that data is to be analysed in the analysis system 1-300. Those skilled in the art will realize that the amounts of data can be enormous and the bandwidth of data communications between the ERP system 1-200 and the analysis system 1-300 prevent any kind of interactive real-time analysis wherein data has to be transferred in real time between ERP system 1-200 and the analysis system 1-300.

Let us next assume that all data from the ERP system 1-200 is mirrored locally in the analysis system 1-300, in a normalized mode wherein all data items are stored exactly once. In such a system, it is the bandwidth between the database and server of the analysis system 1-300 that precludes real-time analysis if any non-indexed database operations spanning the entire database are needed. There is thus a motivation to cache some intermediate results to speed up the analysis. On the other hand, if too much of the intermediate results are cached in the analysis system 1-300, the problem is that any changes in the events of the logistic process 1-100, or its model in the ERP system 1-200, render the cached intermediate results obsolete. Also conducting the analysis itself may result in excluding certain source data events, making it necessary to re-calculate some or all cached values. The question, then, is what to cache and how?

A yet further problem relates to the fact that computer-implemented analysis systems are effective in screening processes that, say, take a longer time to complete than what is considered normal for a process of a given type. Yet computers have poor or no abilities to understand why a process takes an abnormally long time to complete. Accordingly, there is need for an interactive user interface via which a human user can focus on the problem spots in the logistic processes. Again, one should keep in mind that in addition to the high-level cognitive problem of what information should be provided to the human user, there are underlying technical problems of how to make the computer-implemented analysis system efficient enough such that interactive real-time analysis is possible. The combination of interactive usage and usage of advanced data mining and statistical analysis algorithms is specially advantageous when utilizing this invention.

DISCLOSURE OF THE INVENTION

An object of the present invention is thus to provide a method, an apparatus and a computer program product so as to solve alleviate one or more of the problems identified above.

The object of the invention is achieved by aspects of the inventions as defined in the attached independent claims. The dependent claims and the following detailed description and drawings relate to specific embodiments which solve additional problems and/or provide additional benefits. Some aspects of the invention relate to methods for process analysis. Other aspects of the invention relate to computer systems for performing process analysis. Yet other aspects of the invention relate to computer-readable media embodying program code the execution of which in a computer system causes the computer system to carry out one or more of the methods according to the invention.

The present patent specification relates to a group of related inventions or feature sets that can be used individually or in combination. Specifically, the present invention corresponds to the first feature set in the following list of feature sets. The remaining feature sets or individual features from the remaining feature sets may be used as embodiments of the present invention.

A first feature set of the group of inventions relates to automatic discovery of processes in imported event instance data wherein the event instance data does not exillicitly identify any processes.

A second feature set of the group of inventions relates to interactive filtering techniques by which a new process analysis can be made by using the results from previous process analysis as configuration options for the new process analysis, ie the set of currently presented processes and events can be dynamically altered.

A third feature set of the group of inventions relates to an optimized caching scheme which expedites analysis of the identified processes in a server system, such as an SQL server.

A fourth feature set of the group of inventions relates to techniques for efficient identification and processing of categories of processes.

A fifth feature set of the group of inventions relates to techniques for analysing the discovered process instances and making a prediction and suggestion based on the analysis.

Each of the feature sets can be embodied as methods, computer systems or computer-readable media carrying computer program products.

It will be apparent that each of the first through fifth feature sets solve one or more technical problems relating to processing efficiency, data security or the like. Improved processing efficiency and/or data security enable users to perform interactive real-time analyses on the real-world processes supported by the one or more information management systems. For instance, attempts to understand, analyse and improve the current processes include a variety of the following challenges:

Actual business processes contain multiple different variations.

Understanding of the current as-is situation, which is necessary for developing processes and improving quality, is difficult because prior art information management systems provide little or no useful information pertinent to cause-effect relations between events.

Large amounts of detail-level information need to be captured in order to identify root causes for problems and to prioritize solutions.

Prior art information management systems provide little or no useful information pertinent to automated discovery and reverse-engineering of business processes.

There is thus a need to create understanding of the as-is situation, whereby analyses and actions can be based on facts.

There is a need to detect information that allows benchmarking of processes within organizations.

Similarly, there is a need for direction to improvement efforts.

Any analysis of business processes should be reproducible whereby changes can be verified.

Examples of business scenarios:

An organization may have gone live with an ERP system during the past year and is unsatisfied with the current situation.

The organization wants to improve its understanding of the as-is situation in order to focus development work to the most important issues.

Some important results from an analysis of an Order-to-Cash process include:

Fact-based illustrations of Order-to-Cash process:

Documentation of the way how ERP system is used (IT perspective).

Service levels and delivery times (customer perspective).

Process variation and needs for improvement (process perspective).

Identification of root causes for not meeting the delivery times.

Quick wins and other "clues" for further analysis.

Process analysis increases understanding between IT and business. It prepares the ground for their joint development work in the future.

The analysis confirms several challenges, both small and large. With large business volumes relatively small issues become major problems.

Identifies important process measures and provide performance data.

The first feature set of the invention, which relates to automatic discovery of processes in imported event instance data, wherein the event instance data does not explicitly identify any processes, can be embodied as a method in the following manner.

The method steps are labelled a) through f) merely to facilitate discussion and not to restrict the order of execution of the steps:

A method for analyzing information derived from event data by a computer-implemented analysis system, which comprises a server and one or more clients, wherein the event data describes a real-world process the execution of which is supported by at least one information management system but the real-world process is not directly connectable with the computer-implemented analysis system, the method comprising the following acts performed by the server:
  a) importing event instance data comprising a plurality of event instance data sets from the at least one information management system, wherein each event instance data set comprises one or more attributes describing an event instance in the real-world process;
  b) determining for each imported event instance data set a corresponding process instance based on at least the attributes of the imported event instance data set;
  c) determining at least one event order attribute for each imported event instance data set based on at least other event instance data sets corresponding to the same process instance;
  d) forming an analysis result set based on at least the event instance data sets and at least one event order attribute;
  e) sending the analysis result set to one or more clients;
  The method further comprises:
  f) at the one or more clients, presenting an analysis utilizing the analysis result set.

The introductory portion of the method reflects a technical problem underlying the invention, namely the fact that the event data describes a real-world process the execution of which is supported by at least one information management system but the real-world process is not directly connectable with the computer-implemented analysis system. Therefore any detection and observation of meaningful processes must take place indirectly, by importing event instance data from the information-management system. For the sake of clarity and brevity, the information-management system supporting the real-world process will be called an ERP system, whether or not it actually meets any formal criteria for ERP systems.

In the context of the present invention, importing event instance data, which comprises event instance data sets from the information management system(s) to the analysis system means that the server of the analysis system receives the event instance data regardless of whether the server of the analysis system or an external entity initiates such importing. In some implementations, the server of the analysis system may perform data mining operations to the database of other information management system. Alternatively or additionally, one or more external entities may proactively relay event instance data to the server of the analysis system. For instance, the event instance data sets may include an identifier for CustomerID and the external data may provide more attributes for each customer based on the CustomerID identifier found in the event instance data set. Such external data may also contain similar data concerning the discovered process instances, ie, the identified process instances may be discovered from event data, and then the external data may be used to provide more information on the identified process instances. Such external data can be utilized to describe event instance data sets, process instances, event types and flow instance types, for example. As used herein, a flow instance means a transition between two event instances. Correspondingly, a flow instance type means a transition between two event types.

The event instance data imported from information management system, such as the ERP system, does not explicitly relate to any meaningful processes, or if it does, the definition of processes for the purposes of the ERP system may not be applicable for the process analysis. Accordingly, step b) comprises determining for each imported event instance data set a corresponding process instance based on at least the attributes of the imported event instance data set. Attributes are an established term in the field of object-oriented modeling and processing. By way of example, attributes may store information relevant to the order of events, such as time stamps, or they may indicate resources or other events relating to the events.

In addition to the attributes of the imported event instance data set, the determination of the corresponding process instance may be based on external data. For example, in an order-to-cash process analyzed from a customer order perspective, a process may include a customer order identified as "Customer order 543", and for that customer order a delivery event "Delivery 23", that is directly connected to a customer order. The event data may then include a sub-delivery event "Sub-delivery 76". It may be that the event instance data set for "Sub-delivery 76" does not include the information about the end customer order, but instead it includes information about the delivery it belongs. In this case, the event cannot be linked directly to the "customer order 543" by only using attributes of the attributes in event instance data set "Sub-delivery 76" so one must first identify the corresponding delivery event (based on info "sub delivery 76") and then identify the corresponding Customer Order. The information of "Delivery 23" is then used as external data for this particular event instance data set "Sub-delivery 76"

As another example of determining an event type based on information in event instance data set and external data, a patient handling process will be described next. Event instance data set for a patient handling process may include a activity code for the operation performed by a doctor. In the event instance data set, the code may be presented in a very detailed way so that there are thousands of different codes. It might be desired for the analysis purposes to categorize the codes so that there is only 10 different categories into which the codes belong. Now for each event instance data set, we first identify the code from the data set, then use external mapping table for identifying the corresponding group and then use this group as the event type value.

Step c) comprises determining at least one event order attribute for each imported event instance data set based on other event instance data sets corresponding to the same process instance. In a normal environment in which the invention is used, events within the ERP system are separate from each other. According to the first feature set of the invention, the second attribute typically indicates an order or sequence for the event instances for which a common process instance has been determined. For instance, the second attribute(s) for an event instance may indicate a successor (and/or predecessor) of the event instance, or it may be a variable having as a value a timestamp of the event.

For the purposes of process analysis, step d) comprises forming an analysis result set based on at least the event instance data sets and at least one event order attribute, while step e comprises sending the analysis result set to one or more clients. In step f) the one or more clients present an analysis utilizing the analysis result set.

Optionally, the first feature set may comprise determining (eg by calculating) at least one first attribute for each identified process instance based on at least the event instance data sets corresponding to the identified process instance. In an illustrative case, such a first attribute may comprise the number (or value) of sales over a period of time, for a product, for a customer or for a salesperson, or a group of products, customers or salespersons.

As used herein, the analysis result set is a set of data that is typically compiled from a large collection of data. But the analysis result set may not be in a form that is understandable to humans or other clients. Accordingly, the act of presenting the analysis on the basis of the analysis result set comprises converting the analysis result set to a format that is accessible to the client(s). In an illustrative but non-restrictive implementation the act of presenting the analysis result set comprises presenting the analysis result set graphically.

For example, the analysis result set may be formed based on first or second attribute(s). If, say, the first attribute indicates a duration of processes and the second attribute indicates a successor for each event, the analysis result set may comprise different sets of events between common starting and ending events. This kind of analysis, which belongs in a broad class of analyses called benchmarking, is helpful in identifying which of the processes proceeds from the start to the end in the least amount of time or with the lowest number of errors or complaints.

Another technical problem underlying the invention is that processing of the event instance data should be fast enough so that interactive process analysis is meaningful. In a preferred implementation of the invention, all method steps, which involve accessing large amounts of data, are performed in the server, and only the presentation of the analysis, which is based on a relatively compact set of data, is performed in the client(s). In some implementations the server may be a database server, such as an SQL server, which has a fast access to an SQL database. As a result, only the presentation step needs to be performed in workstations, which typically have slower interfaces to the server or database. Instead of the fast access to the database, or in addition to it, the feature of performing most of the method steps in the server may produce other benefits. For instance, the server-based implementation may improve data security as the client(s) do not gain access to the entire database. In some implementations the server may store sensitive data belonging to entities other than the one performing the process analysis, and all the sensitive data remains hidden from the clients. Finally, software installation is relatively easy because the clients only need a simple interface, such as a web browser. For the same reason, processing load imposed on the clients is low. Also a powerful server can serve a very large amounts of clients using because all the clients typically do not use the system at the same time. Server can also have very large data storage capacity. One good way is to deliver the server as a cloud based service serving clients in a very large geographical area.

The second feature set of the invention, which relates to interactive filtering techniques by which a set of currently presented processes can be dynamically altered, can be embodied as a method in the following manner. The introductory portion of the method may be similar to that of the first feature set and is omitted for the sake of brevity. Again, labelling of the method steps does not restrict the order of execution of the steps. The method comprises the following acts performed by the server:

importing event instance data comprising a plurality of event instance data sets from the at least one information management system, wherein each event instance data set comprises one or more attributes describing an event instance in the real-world process;

determining for each imported event instance data set a corresponding process instance based on at least the attributes of the imported event instance data set;

determining at least one event order attribute for each imported event instance data set based on other event instance data sets corresponding to the same process instance;

forming an analysis result set based on at least the event instance data sets and at least one event order attribute;

sending the analysis result set to one or more clients;

the method further comprising:

the one or more clients presenting an analysis utilizing the analysis result set, and in response to receiving an input that is related to the analysis, sending a request to the server;

the server forming filtered event instance data by excluding event instance data sets from the analysis based on the input received from the one or more clients;

repeating at least the above steps of forming the analysis result, sending the analysis result and presenting a revised analysis based on at least the filtered event instance data.

As stated in connection with the first feature set, a client-server architecture provides certain benefits relating to efficiency, data security, ease of installation and minimizing the burden on the clients. Similar benefits may be obtained in connection with the second feature set by performing the bulk of processing steps at the server and performing only the presenting steps at the client.

A benefit of this feature set is that it facilitates entry of parameters for the analysis. It is normally very difficult to give parameters for the analysis. In a typical scenario the original set of events may include a large number of events and process instances that must be excluded from the analysis so that the remaining set of events describes a meaningful set to the client. Interactive filtering according to the fifth feature set of the invention may use results like "duration of process instance", "duration between particular events for the process", "number of particular events for the process", "processes belonging to a particular process variation", "processes including particular events based on other event attributes" or "processes based on certain process attributes". The analysis system may present the results to a client, letting the client to make a selection directly in the results itself, reconfiguring the source data so that the analysis is repeated with a new set of data. This is very logical for the client and leads to new analysis sets that are derived from each other. Also client may add new events to analysis making it possible to first analyze a smaller subset of data and then extending the analysis to a larger data set.

For instance, the creation of the subset may involve including only certain user-selected events and/or processes in the analysis result set, or excluding them from the analysis result set. The user may perform an initial analysis and use the results of the initial analysis to select subsets for further analyses.

In some implementations, each new process analysis set is stored in a database, possibly with some additional information. In one implementation, named "views", which are essentially definitions for sets of event instance data sets, may be stored in the database for later analysis. In one implementation, specific users may get access rights only to some specific sets.

The stored view may include analysis parameters usable for recreating a specific analysis result set. This may mean, for example, that each view indicates what event instance data to include in the analysis, while the parameters of the view indicate which analysis report and which analysis report parameters are referred to.

The third feature set of the invention, which relates to an optimized caching scheme which expedites analysis of the identified processes in a server system, can be embodied as a method in the following manner. The introductory portion of the method may be similar to that of the first feature set and is omitted for the sake of brevity. Labelling of the method steps facilitates discussion but does not restrict the order of execution of the steps:
a) importing event instance data comprising a plurality of event instance data sets from the at least one information management system, wherein each event instance data set comprises one or more attributes describing an event instance in the real-world process;
b) determining for each imported event instance data set a corresponding process instance based on at least the attributes of the imported event instance data set;
c) determining at least one event order attribute for each imported event instance data set based on other event instance data sets corresponding to the same process instance;
d) calculating order information for each event instance data set so that for each event instance data set, an unambiguous and unique predecessor event and successor event can be deduced based on the order information and process instance identifier;
e) storing (eg caching) the calculated order information in the server;
f) forming an analysis result set based on at least the event instance data sets and the calculated order information;
g) sending the analysis result set to one or more clients.

At the one or more clients, an analysis is presented utilizing the analysis result set.

Again, some of the steps may be similar to those of the previous feature sets.

Similarly to the first and second feature sets, a preferred implementation involves performing the majority of the steps in the server, and particularly all steps involving massive database operations, while only the presenting step is performed in the client(s).

In the calculating step d) the unambiguous and unique predecessor and successor events are other event instance data sets for the majority of event instances. For the first and last events, however, the predecessor and successor events, respectively, are empty so that it can be unambiguously seen that they indeed are the actual starting and ending events.

According to an optional feature, when the client sends the server a request to update the analysis result set, the server re-uses the previously created order information to speed up the calculations. For instance, if the process analysis system is coupled to an active information management system in which new event instances are entered continually, utilization of the cached calculated order information in the server permits updating of the analysis result set with sufficient speed so that interactive process analysis is possible. Also the information may be re-used to make the feature set 3—interactive filtering—faster to execute. Also the information may be re-used in creating multiple analysis result sets from the same analysis data.

In some implementations, the server may store the calculated order information, wherein for every event instance data set, the cached information indicates at least the calculated order information and a database id for the successor or predecessor event instance data set. For instance, a specific order number, such as 1, may define the start event for a process instance, while the successor instance data set=NULL may define the end event for a process instance, or vice versa, such that a specific order number (eg −1) defines the last event for a process instance, while the predecessor instance data set=NULL defines the start event for the process instance. For the sake of clarity, most examples are described in such a manner the order=1 specifies the start and successor=NULL defines the end event.

Alternatively or additionally, the server may store the calculated order information, wherein for each event instance the stored order information includes at least one attribute copied from the successor event for the timestamp of the event or event type or the event. The server may optionally use previously stored order information when calculating new order information for a new analysis based on a new set of event instance data sets. This feature is specially advantageous when the user is using the filtering capabilities of the second feature set and the set of event instance data sets is a subset of a larger set of event instance data sets for which the order information has already been created. This is advantageous also in situations when one or more event instance data sets are added to the analysis system which already includes existing event instance data sets for which the order information has been calculated and stored.

The fourth feature set of the invention, which relates to techniques for efficient identification and processing of categories of processes, can be embodied as a method in the following manner. The introductory portion of the method may be similar to that of the first feature set and is omitted for the sake of brevity. Again, labelling of the method steps does not restrict the order of execution of the steps:
a) importing event instance data comprising a plurality of event instance data sets from the at least one information management system, wherein each event instance data set comprises one or more attributes describing an event instance in the real-world process;
b) determining for each imported event instance data set a corresponding process instance based on at least the attributes of the imported event instance data set;
c) determining at least one event order attribute for each imported event instance data set based on other event instance data sets corresponding to the same process instance;
d) calculating order information for each event instance data set so that for each event instance data set, an unambiguous and unique predecessor event and successor event can be deduced based on the order information and process instance identifier;
e) determining for each process instance an ordered list of related event instance data sets based on the order information of event instance data sets;
f) calculating process variation information for each process instance based on at least on attribute of each event in the ordered list of related event instance data sets;
g) storing (caching) the calculated process variation information in the server;
h) forming an analysis result set based on at least the event instance data sets and the calculated process variation information;
i) sending the analysis result set to one or more clients; and
j) at the one or more clients, presenting an analysis utilizing the analysis result set.

Again, steps a) through d) may be similar to those of the previous feature sets, and step e) can be similar to that of the third feature set. Likewise, the two last steps can be similar to the two last steps of the first feature set. Similarly to the first and second feature sets, a preferred implementation involves performing the majority of the steps in the server, and particularly all steps involving massive database operations, while only the presenting step is performed in the client(s).

In some implementations the server may store (eg cache) the calculated process variation information so that for every process instance the stored process variation information includes at least the ordered list of event type identifiers of the event instance data sets connected to the process instance. The server may store the calculated process variation information in such a manner that the ordered list of identifiers is stored in a single database attribute for the process variation so that it can be referred with database functions. For instance, the database function may be a string processing function handling regular expressions.

For instance, the server may calculate and store a hash-like variable, which is calculated based on the process variation in such a manner that for each new process instance the server can effectively search and identify an already existing process variation or create a new variation. As used herein, "a hash-like variable calculated based on the process variation" means that the variable is calculated by means of a function that specific features of hash functions, but not necessarily all of them. Specifically, the hash-like function should provide two features. A first desirable feature is strong lossy compression from the input space to the output space. As a result, even extremely long process variations are compressed to a bit or character string that is searchable by the string processing functions of the server. Because of the lossy compression, the other desirable feature is approximately even distribution of output variables regardless of the distribution of the input variables. As a result of the lossy compression, there are several different input variables (descriptors of process variations) that are compressed to the same output variable. A benefit of the even distribution of the output variables is that the entire output variable space is used evenly. This feature reduces the risk of having specific output variables that correspond to huge numbers of different input variables.

Still further, the server may use previously stored variation information when calculating new variation information for a new analysis based on a new set of event instance data sets. This feature is advantageous when the user is using the filtering capabilities of feature set 2 and the set of event instance data sets is a subset of a larger set of event instance data sets, for which the variation information has already been created. This feature is also advantageous in cases wherein one or more event instance data sets are added to the analysis system, which already includes existing event instance data sets, for which the variation information has been calculated and stored.

A distinctive feature of the fourth feature set is the calculation of the process variation information for each process instance. In one specific implementation the process variation information is based on the event types of the ordered set of event instance data sets. This means that the process variation is defined by the chain of event types (or event classes) traversed by the process. Any two or more processes in the same process variation if the processes have exactly the same sets of event types in exactly the same order. In other words, any processes within a single process variation may only differ from each other in respect of the detail level of event instance data sets, but the event types must be the same and in the same order. For example, consider the following events:

| ProcessInstance | Activity | Person | Timestamp |
|---|---|---|---|
| 01 | Create | John | 1 Jan. 2012 |
| 01 | Modify | Mary | 2 Jan. 2012 |
| 01 | End | John | 3 Jan. 2012 |
| 02 | Create | John | 4 Jan. 2012 |
| 02 | Modify | John | 5 Jan. 2012 |
| 02 | End | John | 6 Jan. 2012 |

When the process variation is calculated for the event instance data set attribute "Activity", then a possible process variation for process instances 01 and 02 can be "Create, Modify, End" and "Create, Modify, End", respectively. If the variation is calculated for attribute "Person", then a possible process variation for process instance 01 can be "John, Mary, John" and for the instance 02: "John, John, John".

According to an optional feature, when the client sends the server a request to update the analysis result set, the server re-uses the previously created process variation information to speed up the calculation. Again the calculated information may be re-used to make the second feature set—interactive filtering—faster to execute. Also the information may be re-used in creating multiple analysis result sets from the same analysis data.

The fifth feature set of the invention, which relates to techniques for analysing the discovered process instances and making a prediction and suggestion based on the analysis, can be embodied as a method in the following manner. The introductory portion of the method may be similar to that of the first feature set and is omitted for the sake of brevity. Again, labelling of the method steps does not restrict the order of execution of the steps:

importing event instance data comprising a plurality of event instance data sets from the at least one information management system, wherein each event instance data set comprises one or more attributes describing an event instance in the real-world process;

importing event instance data comprising a plurality of event instance data sets from the at least one information management system, wherein each event instance data set comprises one or more attributes describing an event instance in the real-world process;

determining for each imported event instance data set a corresponding process instance based on at least the attributes of the imported event instance data set;

determining at least one event order attribute for each imported event instance data set based on at least other event instance data sets corresponding to the same process instance;

creating a causal model based on at least the event instance data sets;

using the causal model to calculate a probability for at least one predicted future event not included in the data for at least one process instance based on at least the causal model.

forming an analysis result set based on at least the event instance data sets and at least one predicted future event;

sending the analysis result set to one or more clients;

the method further comprising:

at the one or more clients, presenting an analysis utilizing the analysis result set.

Again, some of the steps may be similar to those of the previous feature sets. Similarly to the first and second feature sets, a preferred implementation involves performing the majority of the steps in the server, and particularly all steps involving massive database operations, while only the presenting step is performed in the client(s).

The causal model may be created based at least partially on linear correlations between event types derived from event instance data sets imported to the system. Alternatively or additionally, the causal model may be created based at least partially on the basis of separately imported general prediction data.

In some implementations, the server may calculate the probability for an event of a particular event type. Alternatively or additionally, the server may calculate the probability for an event of a particular timestamp. Yet further, the server may calculate the probability for a process instance to match any particular process variation. The server may calculate some or all of these probabilities based on at least influence data that is derived from event in-stance data sets imported to the system.

The server may further calculate the probabilities based on at least one additional event of a certain event type imported to the analysis system. In one illustrative example, the server may determine that activity X maximizes the probability for a desired future event and suggest that a salesperson performs activity X. A distinctive feature of the fifth feature set is that the probability of a predicted future event is calculated for at least one process instance. This comprises a method wherein the system is used to predict probabilities for certain events for process instances. For example a sales process analysis system may calculate the probability of a sales case of becoming Won or Lost based on the prior events loaded into the system for other sales cases and this particular sales case. The analysis system can then provide answers to a number of questions, examples of which follow shortly. In the list of exemplary questions, the term "status of a process instance" refers to a chronologically latest value of a given event type attribute for a process instance. For example, the status of a sales case can be regarded as the value of event attribute "status" recorded in event instance data sets whose event type is "StatusChanged". The process instance may have a variety of events, and for determining the Status of the process instance, the analysis system first filters out all other event instance data sets except the ones when the event type is "StatusChanged". Then the analysis system locates the last ones of those event instance data sets separately for each process instance and defines that as the status for the process instance. Prediction about future status then means that in the future, there will occur a new event whose event type matches our definition of status. In other words, the event type may be "StatusChange" and the value in the "status" attribute would be the predicted value. The following is a non-exhaustive list of possible predictions that can be performed by an embodiment of the invention that implements the fifth feature set:

How likely it is for the "sales case X" currently in a status of "Offer Sent Out" to reach a status of "Customer Purchase"? Answer could be a probability percentage in a range of 0% to 100%

How likely it is for the "sales case X" currently in a status of "Offer Sent Out" to reach a status of "Customer Purchase" by the last day of this quarter? Answer could again be a probability percentage in a range of 0% to 100%

What would be the likelihood of "sales case X" currently in a status of "Offer Sent Out" to reach a status of "Customer Purchase" during a certain month within the next 3 year period given the assumption that the "sales case X" will reach that status? Answer could be a list of probability percentages in a range of 0% to 100% for all future months for 3 years and then maybe a leftover probability of the status being reached outside the 3 year period.

Given a possibility of adding a new event of at least one event type to the event instance data set for a given period for at least one process instance, what event type would have a best effect in raising the probability of a process instance reaching a desired goal status. Answer could be for example that "adding event of type 'e-mail sent to customer' would increase the probability of sales case X of reaching the customer purchase status from 23% to 45%."

Prediction could also be used for all open sales cases, ie, sales cases currently having a certain status, such as "not closed". In this scenario the system could show all cases for a given salesperson, and assuming that the salesperson was able to write an e-mail message, then the analysis system could predict how big an effect the e-mail message may have on the probability of any of these sales cases to reach a "customer purchase" status within the current quarter. With this information, the salesperson could then write the e-mail to the customer in which case the effect is maximal.

The salesperson of the previous example may also be able to perform any of a number of other activities, ie, to conduct a real life activity that may produce an event instance data set with a particular event type and attribute values. In one illustrative example, sending an e-mail requires two hours, making a phone call requires one hour, sending an offer to a customer for whom a pre-study has been made requires four hours and making a personal visit to the customer takes eight hours. Considering this situation, the analysis system can suggest an optimal way to spend the next two business days, or 16 business hours, given the current status of process instances. This mode of utilizing the invention helps maximize the number of process instances reaching a "customer purchase" status during the on-going quarter.

Moreover, in all of the above examples, the increase in percentages of the possibility to reach a certain status may be further used to calculate the business effect of case obtaining this status. This may mean that an increase from a 23% probability to a 45% probability for a case with a business value of $10.000 would mean an increase of 22%×$10,000=$2,200 value for the business. In this way the analysis system can suggest for any given set of process instances and any given set of possible actions that may be performed an optimal set of actions that should be performed (which actions to which process instances by which person) in order to maximize the business outcome of the processes.

As a still further example, the user may request the analysis system to give an estimate for any particular case. The analysis system may also assist the salesperson in selecting a most beneficial activity, ie, the activity and the process instance the salesperson should do next to maximize their sales pipeline value and the probability of sales cases obtaining a "won" status. Such an analysis may be performed automatically, in such a manner that the system performs an activity when a certain result appears in the analysis results.

Calculations in the fifth feature set may be performed using the following techniques:

Constructing a causal model to find correlations between any given status and given predicted status. The model is preferably constructed in such a way that the Event Instance data sets are not independent. This means that the model takes into account each event instance data set corresponding to the process instance and uses all these past events in finding correlations and influencer information.

The causal model could use, possibly which different weightings based on process instance attributes, information from all process instances. For example sales cases where the salesperson is same may have a bigger effect than sales cases, ie. process instances, where the salesperson varies. Also process instances belonging to same organizational or geographical unit might have a bigger influence than process instances from different units. The same methodology could be used for process instances where the same product or product from the same product group has been sold. And yet another example may be based on same or similar customer.

The causal model may also use benchmarking data from others customer. For example a cloud-based customer relationship management system, like "salesforce.com", may contain data for multiple organizations in the system. Organizations may provide their sales process data as a benchmarking data for constructing a causal model so that similarities in other organizations, possibly from same industry or same geographical location of same customer, or somehow same business, may be shared.

The reader is reminded of the fact that the problems underlying the invention are a mixture of cognitive and technical nature. Although the argument can be made that detection of the business processes and understanding of the causal and other relations is a cognitive problem, the technical problems relate to performing the analyses with sufficient speed so that interactive process analysis is meaningful. This in turn involves the problem of how to perform the various detection and calculation steps in the server, in view of the fact that typical server software do not provide built-in functions for such purposes.

Optional Features for all Feature Sets

Some optional features, which can be combined with any of the above-identified first through fourth feature sets, will be described next.

For the purpose of importing event instance data sets: multiple event instance data sets can be created from a single event instance data set in the actual source data from external system. For example a real world event may have attributes like "event started" and "event completed". Part of this invention is that for the sake of the analysis it may be advantageous to break each available timestamp value of each event into a separate event instance data set. By using this technique a concept of parallel events may be managed so that each event itself has no duration and that there is no overlapping events. This makes the analysis much faster while still preserving full capabilities for analysing parallel real-world events with individual start/stop/continue/halt/waiting kind of atomic events for each real world event. Also when constructing the order information it may be useful to utilize external information like "event instances of event type 'first aid started' should always be placed before an event of type 'first aid test 1'" even though both events would have exactly the same timestamp value. This means that when calculating for example the process variations these two events will cause less variations in case there exists many process instances having both event types with same timestamp. Also the external order information may be deducted from the analysis itself, ie. If Event X typically occurs before Event Y then the analysis system may use a rule to place Event X always before Event Y in case they both happen to have a same timestamp for events in an individual process instance.

An optional feature of the invention involves processing the event instance data sets that result from real-world event in a way that each event imported to the system has exactly one timestamp value indicating the actual moment in real time when the event occurred. For each event corresponding to the same process instance, the timestamp value is different. In the real world this is not always true, since in the real world there may be events that occur exactly simultaneously. Moreover, typical real-world events may have multiple timestamps, such as a start timestamp and finish timestamp, whereby multiple events may occur simultaneously. For example a patient in a hospital treatment process can visit a hospital in a "ward stay" that takes three days, and during that ward event there can be a "discussion with doctor" event that takes 20 minutes. During that discussion, the doctor may measure blood pressure at a certain timestamp x. In this situation the real world events like "ward stay" and "discussion with doctor" are divided into sub-events such as "ward stay start", "ward stay finish", "discussion with doctor start" and "discussion with doctor finished". These sub-events are then assigned a unique timestamp within the process instance. A benefit of the unique timestamp is that the analysis system may obtain unambiguous order information for all events being imported into the analysis system. In some applications, it may be beneficial to artificially force ordering rules in such a manner that there is a well-defined fixed order. From the point of view of the analysis system the benefit is that the fixed order enables use of algorithms that are efficient with very large data sets. For human users the fixed order facilitates comprehension of the analyses.

For the purposes of duration analysis, at least one date-time attribute may be determined for each event instance data set based on at least the information contained in the event instance data set. Optionally, at least one duration attribute may be calculated for each process instance based on at least the difference between the date-time attribute of the chronologically last event instance data set and the chronologically first event instance data sets, wherein the last and first event instance data sets correspond to the process instance in question. For instance, the duration analysis may further comprise determining information on the total duration of all process instances. According to a further optional feature, the process instances may be divided into categories based on the value of the duration for each process instance. For example, the categories may include seconds, minutes, days, weeks, months, or years. According to another further optional feature, the duration analysis may include generation of a table or graph, which shows the discovered categories and the numbers of process instances belonging to each category.

Further useful analyses may be based on the detection of event types. One optional feature comprises determining a value for at least one event-type category for each event instance data set based on at least the information contained in the event instance data set. Later in this patent specification, an event instance data set is said to belong in a certain event-type if the value of the event-type attribute (of the event instance data set) that was selected for the analysis is the same as the value of the event-type. For some analysis types, the event types may be based on actions performed, while for other analysis types the event types may be based on a person or resource involved in the action. As a still further example, the event type may be based on patient disease diagnosis code. Yet further, an event type may be a combined value. For example, a combined event type value in an order-to-cash process may be based on the action performed and the person performing the action. Consider the following example:

| ProcessInstance | Activity | Person | Timestamp |
|---|---|---|---|
| 01 | Create | John | 1 Jan. 2012 |
| 01 | Modify | Mary | 2 Jan. 2012 |
| 01 | End | John | 3 Jan. 2012 |
| 02 | Create | John | 4 Jan. 2012 |
| 02 | Modify | John | 5 Jan. 2012 |
| 02 | End | John | 6 Jan. 2012 |

The above feature may be modified such that the analysis includes information on the occurrences of at least one determined event-type attribute value. For example, the event-type attribute value may indicate one or more of the following: 1) total number of event instance data sets per each unique value of event-type attribute; 2) total number of process instances that are linked to at least one event instance data set having a certain event-type attribute value; 3) relative occurrence (using Timestamp from A and Name from B) showing average relative occurrence of every event instance data set corresponding to a certain event-type in relation to all event instance data sets separately for each process instance; and 4) relative occurrence variation for the above mentioned average.

For performing case table analysis, any of the above-identified feature sets may be complemented with a feature of calculating at least one event-type-amount attribute is calculated for each process instance, so that the value of a particular event-type-amount attribute is equal to the number of event instance data sets of the particular event-type corresponding to the process instance. Optionally, the case table analysis may include information on at least one event-type attribute for at least one process instance.

According to another optional feature, each process instance may be categorized into a process variation on the basis of the process instance data and attributes, as well as the event instance data set information and attributes. The process variation for a process instance may be formed by first ordering the event instance data sets by the derived date-time attributes in a chronological order and then taking the event-type attribute values from each event instance data set. What this means is that if any two process instances have exactly the same number of events, and when the events are ordered by their date-time attributes, the event-types of the events are exactly the same and in exactly the same order for both process instances. Optionally, some event instance data sets may be excluded by a rule set when calculating the process variation. The rule set may be permanent, semi-permanent or dynamically alterable via the user interface.

According to a further optional feature, some additional calculated events may be introduced based on information derived from the attribute values, such as the duration between two events or the number of repeating events having the same event-type. Alternatively or additionally, the process variation for a process instance may be formed by calculating the number of event instance data sets belonging in the process instance. Alternatively or additionally, the process variation for a process instance may be formed by calculating the number of unique event instance data sets belonging in the process instance, so that all the event instance data sets having the same event-type value are counted as a single event when calculating the total number of unique events. Optionally, the analysis may further comprise determination of one or more of the following:

information on the occurrences of process instances for each discovered process variation, or
number of the occurrences of process instances for each discovered process variation, or
relative number (eg a percentage) of the occurrences of process instances for each discovered process variation per the total number of process instances, or
any of above but the result set is limited to a maximum of X process variations.

Process analysis may be further enhanced by one or more of the following features. One optional feature comprises determining a flow instance, for each two consecutive event instance data sets for any process instance. The attributes of the flow instance may include a predecessor event and/or a successor event. For example, the two consecutive event instance data sets may belong in same process instance, and when all events belonging to the same process event are ordered by the date-time, so that each event has a unique date-time, there are no events falling between these two events. In other words, these two events are a predecessor or successor events for each other.

According to a further optional feature, new attribute values may be calculated for each flow instance. The new attributes may include one or more of the following: 1) predecessor date-time; 2) successor date-time; 3) duration (which may be calculated as successor date-time minus predecessor date-time; 4) cost (which may be calculated as a minimum or maximum or average of the predecessor and successor events).

Yet further, for each discovered flow instance, a corresponding flow type may be determined by combining the event type of the predecessor event instance data set and the event type of the successor event instance data set, wherein the event type attributes include at least the event type of the predecessor event instance data set and the event type successor event instance data set.

Alternatively or additionally, new attribute values may be calculated for each flow type. The new attributes for flow type may include one or more of the following:

Total number of flow instances corresponding to the flow type (=all occurrences);
Total number of process instances that include a flow instance that belongs to this flow type (=unique only);
Average duration of flow instances belonging to this flow type+the standard deviation;
Median duration of flow instances belonging to this flow type;
Total cost and average cost of a cost attribute for each flow instance belonging to this flow type; and/or
Weighted average duration, wherein the duration of each flow is weighted with the cost of each flow when calculating the average duration.

Alternatively or additionally, new attribute values may be calculated for each event type. The new attributes for event type may include one or more of the following:

Total number of event instances corresponding to the event type (=all occurrences);
Total number of process instances that include an event instance belonging to this event type (=unique only);
Average duration of event instances belonging to this event type+the standard deviation, calculated from two selected date-time values of each event instance data set;
Median duration of event instances belonging to this event type
Total cost and average cost of a cost attribute of each event instance belonging to this event type; and/or
Weighted average duration where the duration of each event is weighted with the cost of each event when calculating the average duration.

A still further optional feature of the invention comprises creating an analysis report showing information on event instance data sets, process instances, flow instances, event types and flow types. The analysis report may show such information graphically and/or numerically.

Creation of the analysis report may further include drawing a symbol for each discovered event type and/or drawing a directed connector symbol that connects each two event types in a case wherein there is a flow type from a predecessor event type to successor event type. The analysis report may further include at least one attribute value of event type to the symbol representing event type. For example, the attribute value may indicate a name, duration, quantity (number or amount) of something, or the like. Alternatively or additionally the analysis report may include at least one attribute value of flow type to the symbol representing flow type. The examples for flow type attributes may be similar to the examples for event type attributes.

A still further optional feature of the invention comprises a method wherein new events are added to the analysis. This adding can be done by importing several events in batches or it can be done by receiving individual events whenever they become available. For example a RFID reader may notice an event related to a delivery of a particular product whenever the product is loaded into a ship. The RFID reader may then send this event to an RFID server, which in turn sends the event with some event attributes to process analysis server. In the analysis server, the adding of one event may then cause a change to analysis results, cached information about event orders and process variation, and for example an alert message being sent. Also the adding of new event may result in information related to that particular event to be sent and maybe also shown in client terminals.

Yet another optional feature of the invention comprises a method wherein filtering is done by using a parameter for the analysis. This parameter can be for example the relative amount of process instances having an event of a particular event type compared to the total amount of process instances. For example the event type "Offer Changed" may occur in 7% of the process instances in sales process. There could be for example a visibility parameter such that "only show event type" in case the relative occurrence is more than 10%, in which case the event type "Offer Changed" would not be visible. In case the parameter is 5% then the "Offer Changed" event type would be visible. Another example is limiting the depth of a graph, ie, for example only show maximum of 5 levels in a process chart starting from a given event type.

Yet another feature of the innovation is a support for benchmarking. Benchmarking can be done for example by first creating at least two sets of process instances and then creating analysis that shows differences and/or similarities between these sets. These sets may be created for example by utilizing one process instance attribute so that the value of such attribute will determine directly or indirectly the set to which the process instance belongs. On the other hand, the set may be created by filtering process instances separately for 1st set and 2nd set so that the sets may contain same process instances. Or it can be a comparison with a large set of process instances and a smaller sub set of process instances to that particular set, for example the process instances for which the duration was longer than average. Yet another way to build a benchmark set is to include different events to the sets. In this way the process instances may be same in all benchmark sets but one set may contain events of for example a particular event type and another set does not include those events. As part of this feature, the analysis can be done for example by showing the difference in a particular duration, amount, deviation, cost, existence or probability of a certain event, event type, process instance, event attribute, or process instance attribute. A flowchart can for example show as a duration the difference of the durations. A tree-like graph can show the process variation tree separately for all benchmarked sets. A tabular analysis report may include the benchmark set name as a one column and then attributes related to that tabular analysis report as separate columns so that there are separate values for benchmarked analysis sets in separate rows in the tabular report.

A still further optional feature of the invention comprises a method wherein the system is used to predict probabilities for certain events for process instances. For example a sales process analysis system may calculate the probability of a sales case of being Won or Lost based on the prior events loaded into the system for other sales cases and this particular sales case. The system could also assist for example the salesperson in selecting a most beneficial activity, ie. what activity and for what process instance he or she should do next to maximize his/her sales pipeline value and probability of sales cases getting Won. This could also be done automatically so that the system will perform an activity when a certain result appears in the analysis results.

A still further optional feature of the invention comprises a method wherein the analysis report contains calculation of influencers for a process instances. This could be for example calculation of what information in the whole source data set seems to increase/decrease the likelihood of individual process instance to have a certain characteristic—or a predicting for getting the characteristic in a future. This could be done for predicting purposes and the timeframe could also be a particular period like "December/2012".

A still further optional feature of the invention comprises a method wherein there exists a user client program that sends a command related to any of the individual information visible in any of the generated analysis so that an action is performed. For instance, the action may comprise one or more of the following:

Open a new analysis—this creates and opens a new analysis for the selected information Open new analysis with exclude—this modifies the source data set for the analysis so that only certain events and process instances correspond to the object in the analysis result are included in the next analysis Send an alert message to another server, web service or a user, for example as an e-mail, SMS message or web service message Write entry to a log file or database Initiate a workflow, for example with parameters configured based on the analysis results Update a report in a streaming broadcast system A collection of event instance data sets can be comprised into models. Every model can have its own attributes such as model name, access control definitions, view definitions, publicity settings etc.

Access control and user rights management can be implemented for example using role-based access control mechanism.

The model views could be implemented as filters applied for all the event instance data sets in the model. The result of this filtering process which is a new set of event instance data sets, can be used as event instance data set source for creating analyses.

Event instance data set attributes could be saved for example into a relational database so that there are two tables: attribute type and attribute value. The type table defines unique identifiers for attributes, attribute names and their types which could be used to determine whether the attribute is used as an attribute bound to events (which are referred as event attributes later in this document), an attribute bound to process instances (which are referred as process attributes later in this document) or even an attribute bound to models (which are referred to as model attributes later in this document). The attribute value table just defines, in addition to the actual attribute value (that could be stored for example as a kind of a variant-object), the attribute type identifier and the identifier of the object it is bound to. Attributes may also be added for discovered event types and analysis results.

The interface between analysis client and server could be implemented for example in such a fashion that it is possible to configure server to act as a client for another server and to thus delegate all or some of the analysis requests further to be processed by the next server, which in turn can do the same delegation if desired. It may even be possible to run the server and client as programs or processes in the same physical hardware. Such a configurable mechanism could be implemented using a common interface which is implemented by both the "analysis server engine" and the "analysis server client". The client itself just communicates with the server through this common interface.

It could also be possible to implement a mechanism for event, process and model attributes to be re-used by adding a special relation between models. This relation could be used in such a fashion that if such a relation exists between two models, the attributes of objects in one model are also visible for objects in another model, provided that there exists similar object in both models. Object similarity in this case is determined for example by matching process instance names (which is read from some process attribute) or event instance names (which is read from some event attribute) with each other.

There could also be a mechanism for logging all the server requests together with some or all of the given request parameters. This logging mechanism could be used for example for tracking model changes and analysing service behaviour in all kinds of situations. This log could also be used as an event source for process analysis for analysing different aspects of the server behaviour under different circumstances. This mechanism could be further extended to also track progress of long lasting requests by adding progress counter number fields to log entries that are updated during the request processing. The current progress counter status can be queried asynchronously by the client whenever desired. Also this mechanism could be further extended to allow cancelling request processing by allowing client to set specific marker to request log entries, which are periodically checked by the request processor. If the request processor sees that such a marker is set, the request processing will be aborted immediately.

In order to minimize the resources required for storing events with cached information, some kind of mechanism could be added to periodically remove all cache data fulfilling certain criteria. These criteria could include for example that all event caches created for a view of a model which is not published for anybody else but the one who created the view should be deleted if they aren't used within specific amount of time after their previous usage.

Event cache can be implemented for example as separate relational database table for every view of a model, thus making it very easy and efficient to create new event caches and delete unneeded ones.

The server could be implemented as a web service which enables very flexible deployment methods. For example it allows deploying it into some cloud server farm such as Microsoft Azure or into a single server inside corporate domain. Web service could be implemented in such a fashion that it allows importing event instance data sets easily for example using some automatic integration tools that periodically downloads event instance data sets from some external system such as CRM system and imports them to the server via its web service interface.

The analysis results returned from server could be implemented in such a fashion that they always include all the information required to recreate the same analysis later and possibly continue the iterative analysis process from the spot the analysis was made. In addition to this, all the analysis results could include some common set of information such as model name, model's last modified date and the name of the user who last modified the model.

To speed up analysis generation process, the server could allow clients to define some kind of sampling criteria to select only some subset of all the event instance data sets in some view of some model. Sampling criteria could be for example "use only 50% of all the event instances", which could cause server to do the analysis only for some 50% of all the event instances in the view of the model.

A still further optional feature of the invention comprises a method wherein as the analysis is presented to one or more clients, those clients provide additional information such as a comment related to the analysis or any part of it, vote on a predefined scale about for example the importance or severity of the finding or agree/disagree about a previously provided comment or statement. Such information about the usage could then be sent and stored in the server and the information could be used for making further analysis. Also the information about usage, for example how many times a particular analysis has been viewed can be used in prioritizing the importance of analysis compared to each other.

BRIEF DESCRIPTION OF THE DRAWINGS

In the following the invention will be described in greater detail by means of specific embodiments with reference to the attached drawings, in which:

FIG. 4, which contains sub-FIGS. 4(A) through 4(E), shows examples of SQL scripts for initializing and populating various tables in the database of the process analysis system;

-FIGS. 5(A) and 5(B), shows how a cached and ordered relational database table, which has been populated by a script as shown in FIG. 4, can be used to speed up and simplify processing of queries inside the database engine itself;

-FIGS. 6(A) through 6(e), shows examples of process charts of varying detail level, wherein the detail level is based on filtering out rarely-occurring process variations;

-FIGS. 7(A) through 7(C) shows how user-settable filtering may be utilized for detecting problem spots in the real-world process;

FIG. 8, which contains sub-FIGS. 8(A) and 8(B) illustrates concepts relating to identification of processes;

-FIGS. 9(A) through 9(E), illustrates the concept and use of process variations; and FIG. 10 illustrates a causal model, which is a key feature in the fifth feature set and an optional feature in other feature sets.

DETAILED DESCRIPTION OF THE SPECIFIC EMBODIMENTS

Figure 1:
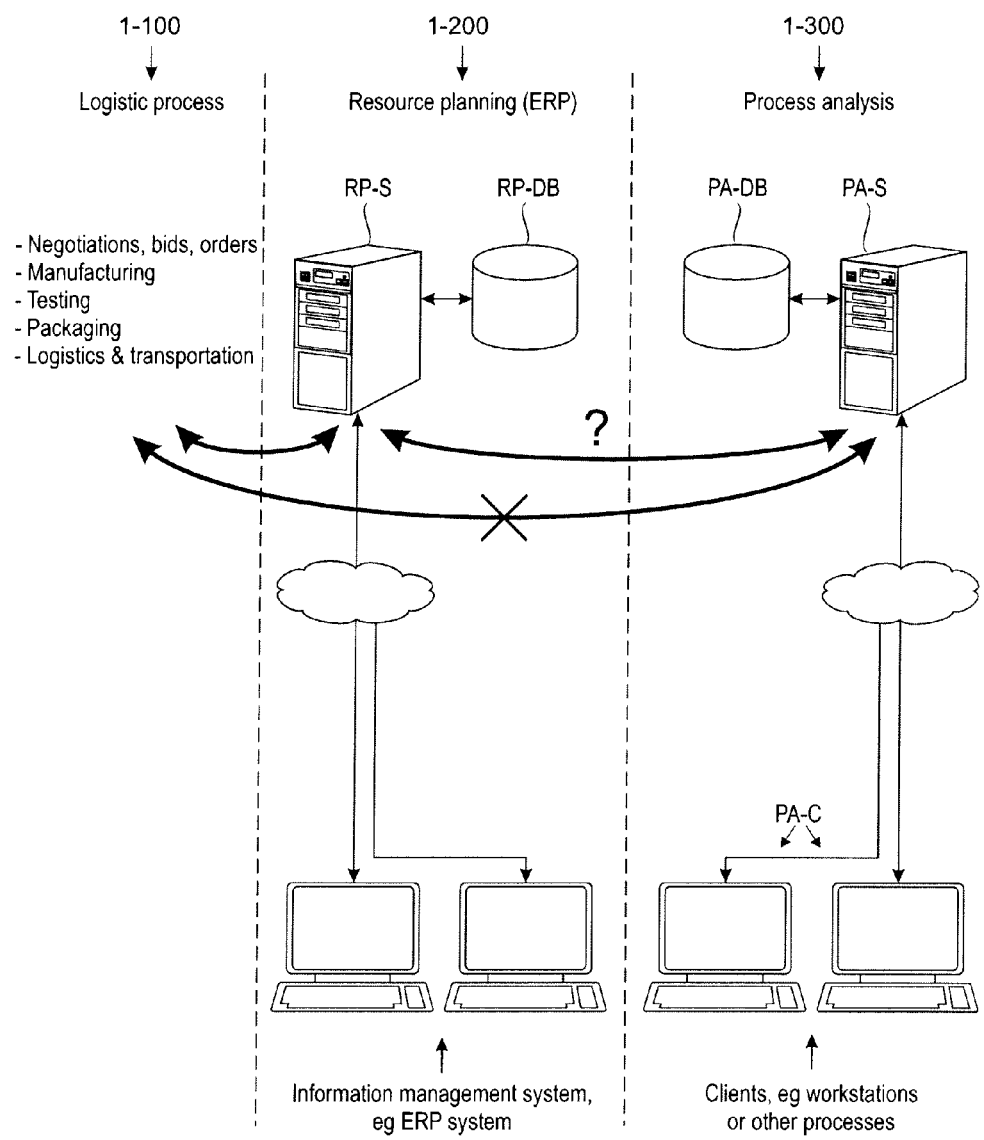
FIG. 1 shows an overall view of an environment wherein the invention can be utilized.
Figure 2:
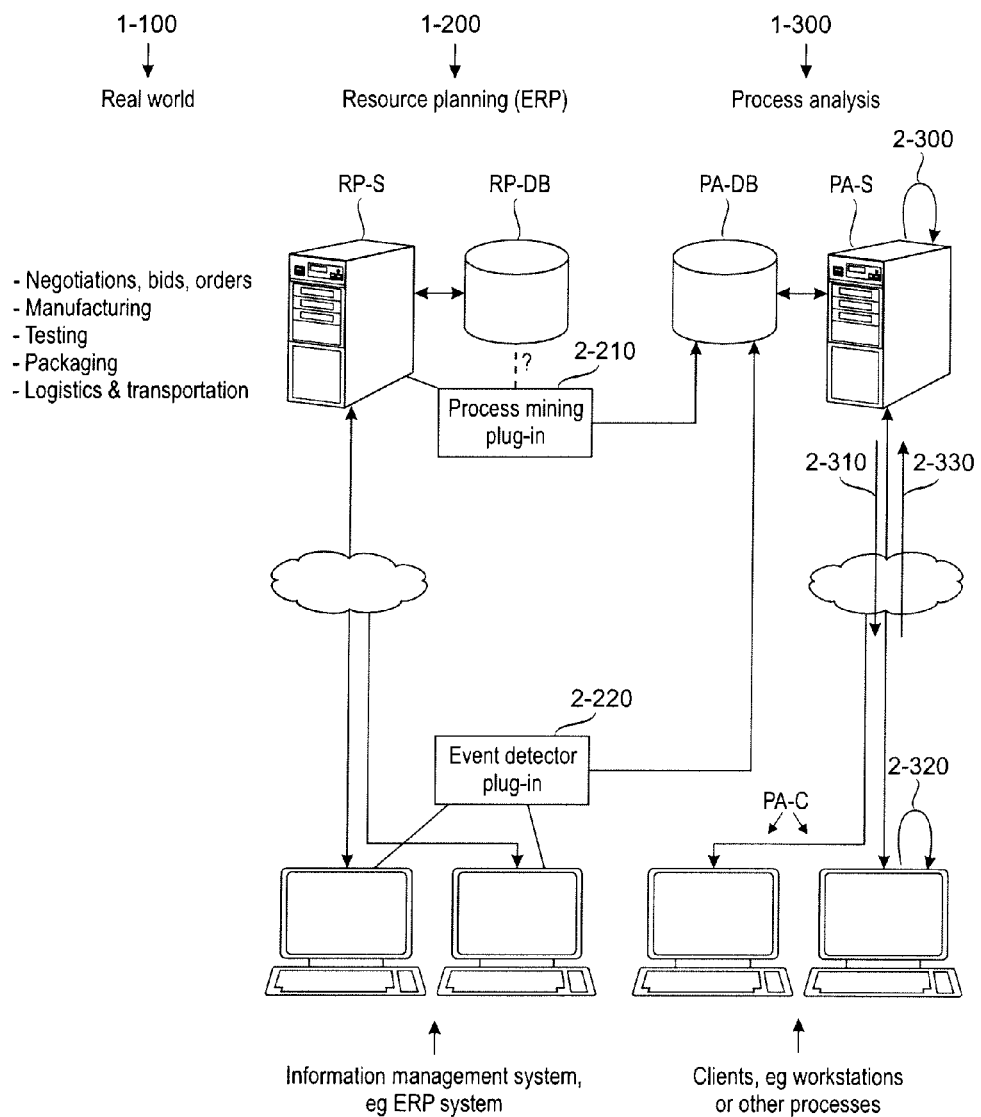
FIG. 2 shows how the computer-implemented process analysis system can be coupled to the ERP system.

FIG. 2 shows how the computer-implemented process analysis 1-300 system can be coupled to the information management system 1-200. In the following, the term "ERP" will be used as in illustrative but non-restrictive example of information management systems that support the real-world process 1-100. Reference sign PA-C generally denotes clients, which may be workstations or other processes accessing the process analysis system 1-300.

There are basically two ways to transfer data relating to the logistic processes 1-100 from ERP system 1-200 to the process analysis system 1-300. For instance, it is possible to provide the ERP system (or other information management system) with one or more data-mining plug-ins, one of which is denoted by reference numeral 2-210. The data-mining plug-ins are configured to find data relevant for process analysis within the and transfer such data to the process analysis system 1-300. Alternatively or additionally, it is possible to provide the clients with event detection plug-ins 2-220 configured to detect events of interest in the ERP system and replicate the events into the process analysis system 1-300. In some exemplary implementations, the event detection plug-ins may comprise RFID readers installed at checkout counters, warehouse exits or the like.

FIG. 2 further illustrates the concepts of analysis result set and presentation of analysis in an interactive manner. Reference numeral 2-300 denotes the act of forming an analysis result set in the process analysis server system PA-S. Arrow 2-310 illustrates sending the process analysis result set from the the process analysis server PA-S to a specific one of the process analysis client computers PA-C. The process analysis server PA-S produces a specific analysis result set 2-310 for each client computer PA-C. Arrow 2-320 depicts presentation of the analysis by the client computer PA-C. Arrow 2-330 relates to the second feature set of the invention, wherein the client computer PA-C, in response to receiving an input related to the analysis result, sends a request to the process analysis server PA-S. As a result of the request 2-330, the process analysis server PA-S forms filtered event instance data by excluding event instance data sets from the analysis based on the request 2-330. Based on the filtered event instance data the process analysis server PA-S then repeats the above steps of forming the analysis result 2-300, sending the analysis result 2-310, while the client computer PA-C re-presents the analysis 2-320 based on the filtered event instance data.

Figure 3:
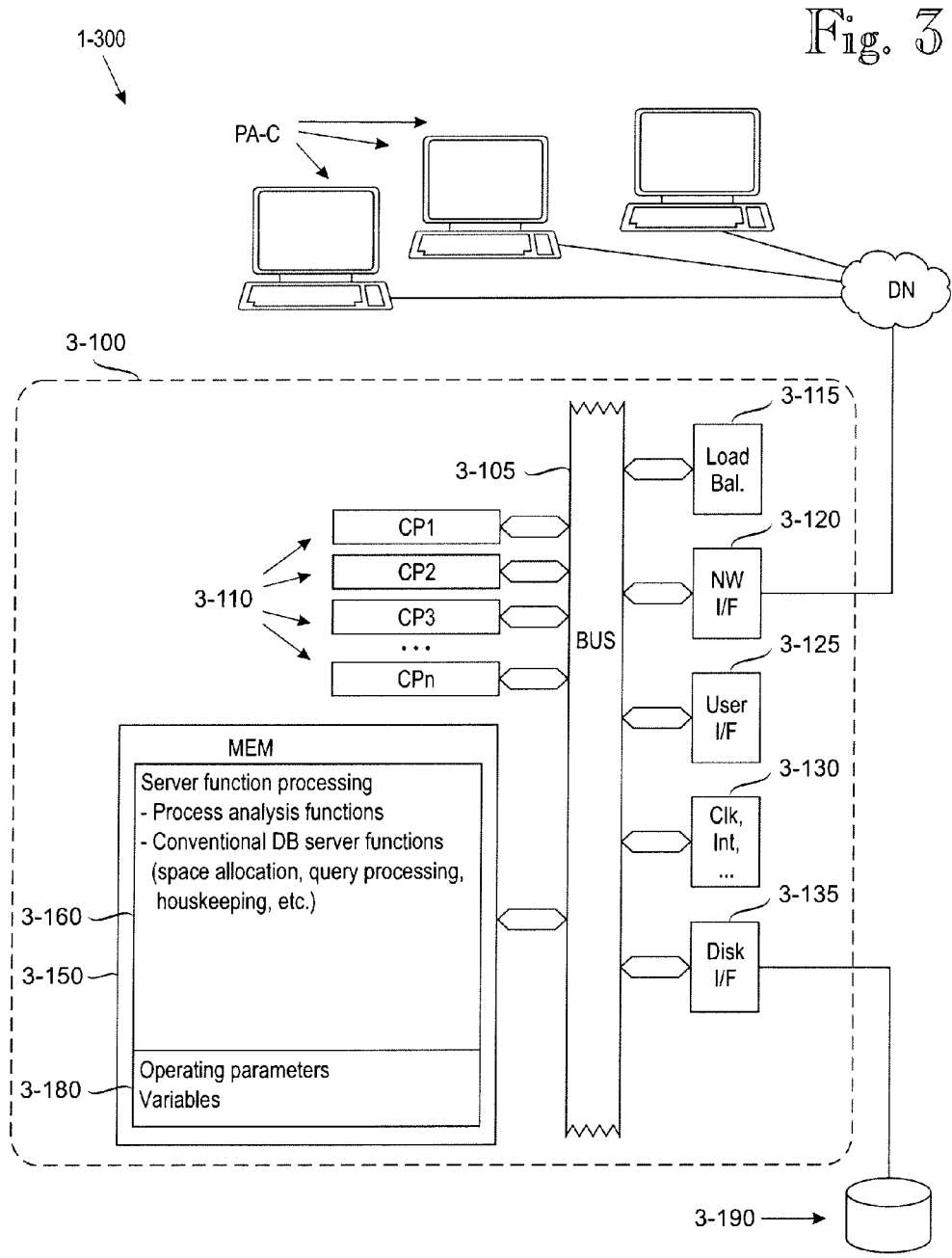
FIG. 3 schematically shows an exemplary block diagram for the database server of the process analysis system.

FIG. 3 schematically shows an exemplary block diagram for the database server SS of the process analysis system. FIG. 3 schematically shows a block diagram of a database server system SS. The two major functional blocks of the database server system SS are a database server computer 3-100 and a disk system 3-190. The server computer 3-100 comprises one or more central processing units CP1 ... CPn, generally denoted by reference numeral 3-110. Embodiments comprising multiple processing units 3-110 are preferably provided with a load balancing unit 3-115 that balances processing load among the multiple processing units 3-110. The multiple processing units 3-110 may be implemented as separate processor components or as physical processor cores or virtual processors within a single component case. The server computer 3-100 further comprises a network interface 3-120 for communicating with various data networks, which are generally denoted by reference sign DN. The data networks DN may include local-area networks, such as an Ethernet network, and/or wide-area networks, such as the internet. The server system SS serves one or more process analysis work stations PA-WS, via the data networks DN.

The server computer 3-100 of the present embodiment also comprises a user interface 3-125. Depending on implementation, the user interface 3-125 may comprise local input-output circuitry for a local user interface, such as a keyboard, mouse and display (not shown). Alternatively or additionally, management of the server computer 3-100 may be implemented remotely, by utilizing the network interface 3-120 and a terminal similar to the process analysis work stations PA-WS. The nature of the user interface depends on which kind of computer is used to implement the server computer 3-100. If the server computer 3-100 is a dedicated computer, it may not need a local user interface, and the server computer 3-100 may be managed remotely, such as from a web browser over the internet, for example. Such remote management may be accomplished via the same network interface 3-120 that the server computer utilizes for traffic between itself and the client terminals.

The server computer 3-100 also comprises memory 3-150 for storing program instructions, operating parameters and variables. Reference numeral 3-160 denotes a program suite for the server computer 3-100.

The server computer 3-100 also comprises circuitry for various clocks, interrupts and the like, and these are generally depicted by reference numeral 3-130. The server computer 3-100 further comprises a disk interface to the disk system 3-190. The various elements 3-110 through 3-150 intercommunicate via a bus 3-105, which carries address signals, data signals and control signals, as is well known to those skilled in the art.

The inventive method may be implemented in the server system SS as follows. The program suite 3-160 comprises program code instructions for instructing the set of processors 3-110 to execute the functions of the inventive method, wherein the functions include performing the process analysis functions according to the invention and/or its embodiments. Specifically, the functions of the inventive method include the acts defined in claim 1.

FIG. 4, which contains sub-FIGS. 4(A) through 4(E), shows examples of SQL scripts for initializing various tables in the database of the process analysis system 1-300 and for populating some of those tables with data originating from the ERP system 1-200.

Reference numeral 4-100 denotes an SQL table definition for a process analysis event table ("PA_EVENT"). In this example, the event table of the analysis system 1-300 will be populated with events (event instance data sets) from the ERP system 1-200. In other words, the event data will be copied from the ERP system 1-200 to the analysis system 1-300. It is worth noting that in the present example, the definition 4-100 for the PA event table does not contain any explicit references to any particular processes. Instead of explicit process identifiers that might tie specific event instances to predefined processes, the present embodiment supports dynamic definition and redefinition of processes in real time. In other words, "processes" (for the purposes of process analysis) can be defined on-the-fly, arbitrarily.

The SQL table definition 4-100 contains a few data items (columns or fields) worth mentioning. Reference numeral 4-110 denotes a process instance identifier, reference numeral 4-115 denotes an example of an event type identifier, reference numeral 4-120 denotes an exemplary timestamp and reference numeral 4-125 denotes an exemplary cost item associated with an event. The cost item, which can be used to indicate resource consumption (monetary or otherwise), may be used in analysis and optimization of processes.

Reference numeral 4-200 denotes an SQL script for creating a temporary cache table that is to contain event order numbers within process instances. Use of both ascending and descending ordering ("EVT_ORDER", "EVT_ORDER_DESCENDING") expedites tracking predecessor-successor relations.

Reference numeral 4-250 denotes an exemplary SQL script for populating the temporary cache table that is to contain event data ordered both in ascending and descending order. Reference numerals 4-261 and 4-262 denote script lines that respectively order the event data in ascending and descending order. Reference numeral 4-264 denotes the table from which the temporary cache table is populated. For the first execution the table 4-264 references table 4-100, and for the subsequent executions it references table 4-200.

Reference numeral 4-300 denotes an SQL table definition for a cached event table ("PA_CACHE_EVENT") for the purposes of process analysis. The cached event table is distinct from the the temporary cache table populated by the script 4-250). The event cache-table is automatically created based on selected view settings. A view setting, which may include a model identifier, may define which event types (=activities), cases and variations are shown and which are hidden from view. The idea here is to create an ordered table of transitions between event instances, wherein the ordering is based on comparison of start times between the event instances. It is thus the comparison of the start time between the event instances that serves as the basis for determining predecessor-successor relations. Reference numeral 4-310 denotes a data item (column) which can be used as the order information. Note the columns starting with "evt" (for event) and "evt_next" (for next event). Reference numeral 4-320 denotes a column for defining a successor event type, while reference numeral 4-330 denotes a column for defining a successor start time. It is worth noting here that in principle the duration of an event instance is of primary importance in process analysis but it is not necessary, or even beneficial, to store the duration of an event as a single quantity for each event. This is because the interactive filtering according to the second feature set may exclude information on very detailed level, which is why some events may not be displayed. Accordingly, it is advantageous to be able to dynamically compute the duration of an event as the difference between the successor start time 4-330 and the event start time 4-120 (shown in FIG. 4(A)).

Reference numeral 4-350 denotes an exemplary SQL script for populating the event cache table, ie, the one initialized by the script 4-300. The script 4-350 uses a self-join to collect both ends of all event transitions into a single row of the event cache table. Reference numeral 4-370 begins a SELECT statement used for the majority of events wherein a next event exists. The SELECT statement contains a JOIN verb 4-372 joining table #PA_EVENT_WITH_ORDER with itself, using alias names E01 and E02. Reference numeral 4-374 denotes a criterion based on the event orders that establishes a predecessor-successor (previous event—next event) relation. Reference numeral 4-376 denotes a criterion that the events must share a common case (process instance) identifier.

FIG. 5(A) shows an exemplary user interface 5-100 for real-time interactive analysis of "processes" whose event data has been transferred from the ERP system 1-200 to the analysis system 1-300. In particular, the event data has been imported to the PA_CACHE_EVENT_ORDERED table that was populated by the script 4-350 shown in FIG. 4.

The quotation marks around "processes" signifies the fact that the ERP system 1-200 does not contain any explicit process indicators, and a considerable amount of processing has to be performed in order to arrive at definitions for "process" that permit meaningful analysis of processes. The reader is reminded of the fact that in addition to the arguably obvious question of how to find out the cognitive information for defining meaningful "processes", there remains the technical problem of speeding up process analysis to a level wherein interactive analysis of arbitrarily defined processes is possible. It may be tempting to believe that caching of frequently-used data is the omnipotent solution to speed-related problems. On the other hand, if everything is cached, then any changes in the data of the ERP system 1-200 obsoletes all data in the analysis system 1-300, and updating of the cached data will emerge as the next bottleneck. The technical problem to be solved is thus: precisely, what should be cached and how, in order to enable interactive analysis of arbitrarily defined processes in a system where the original data (the data of the ERP system) does not contain useful definitions for processes.

Figure 5:
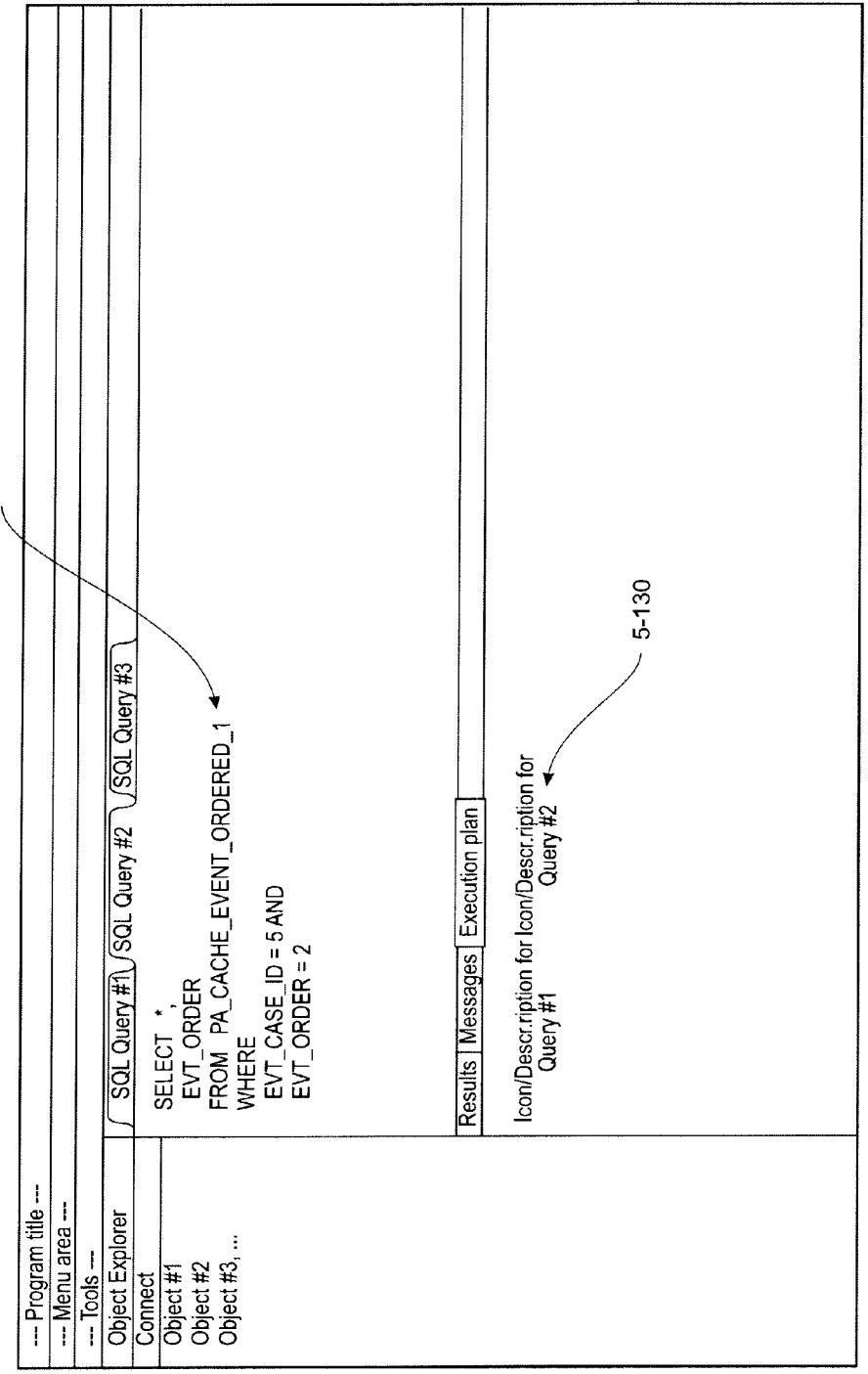
FIG. 5, which contains sub

FIG. 5 contains sub-FIGS. 5(A) and 5(B), both of which are screenshots from Microsoft® SQL Server Management Studio, which can be used to profile and test SQL queries. The queries shown in FIGS. 5(A) and 5(B) yield the same result although they use different approaches, namely cached and non-cached tables for event data, respectively. Reference numeral 5-120 denotes an exemplary query that may be entered via the user interface 5-100. The query 5-120 retrieves event data from the PA_CACHE_EVENT_ORDERED table that was populated by the script 4-350. Specifically, the query 5-120 selects the second event of a case (process instance) identified by case identifier 5.

Reference numeral 5-130 denotes an estimated query plan created for evaluating the query 5-120 using SQL Server 2008 database. As can be seen from FIG. 5, processing the query involves two quite simple processing steps. For the sake of comparison, FIG. 5(B) shows an alternative scenario in which a query 5-170 basically similar to the query 5-120, is applied to a non-cached table. Reference numeral 5-180 denotes an estimated query plan created for evaluating the query 5-180 using SQL Server 2008 database. As can be seen from FIG. 6, processing the query involves nine separate processing steps.

For the sake of comparison, FIG. 5(B) shows an alternative scenario in which a query 5-170 basically similar to the query 5-120, is applied to a non-cached table. Reference numeral 5-180 denotes an estimated query plan created for evaluating the query 5-180 using SQL Server 2008 database. As can be seen from FIG. 6, processing the query involves nine separate processing steps.

What may not be directly evident from FIG. 5(B), but should be apparent to those skilled in the art of SQL processing, is that many of the steps involved in the processing of the query 5-180 require so much database engine resources when large amounts of data are being evaluated that the operation is generally unsuitable for interactive process analysis. The decrease in the number of processing steps and the corresponding increase in processing speed is made possible by an optimized selection of which data tables are cached and which are not.

Specifically, the pre-calculated and cached data should include order numbers ascending and/or descending order for individual events (event instances) within each process instance, as was described in connection with FIG. 4(E).

Filtering with Parameters

Figure 6:
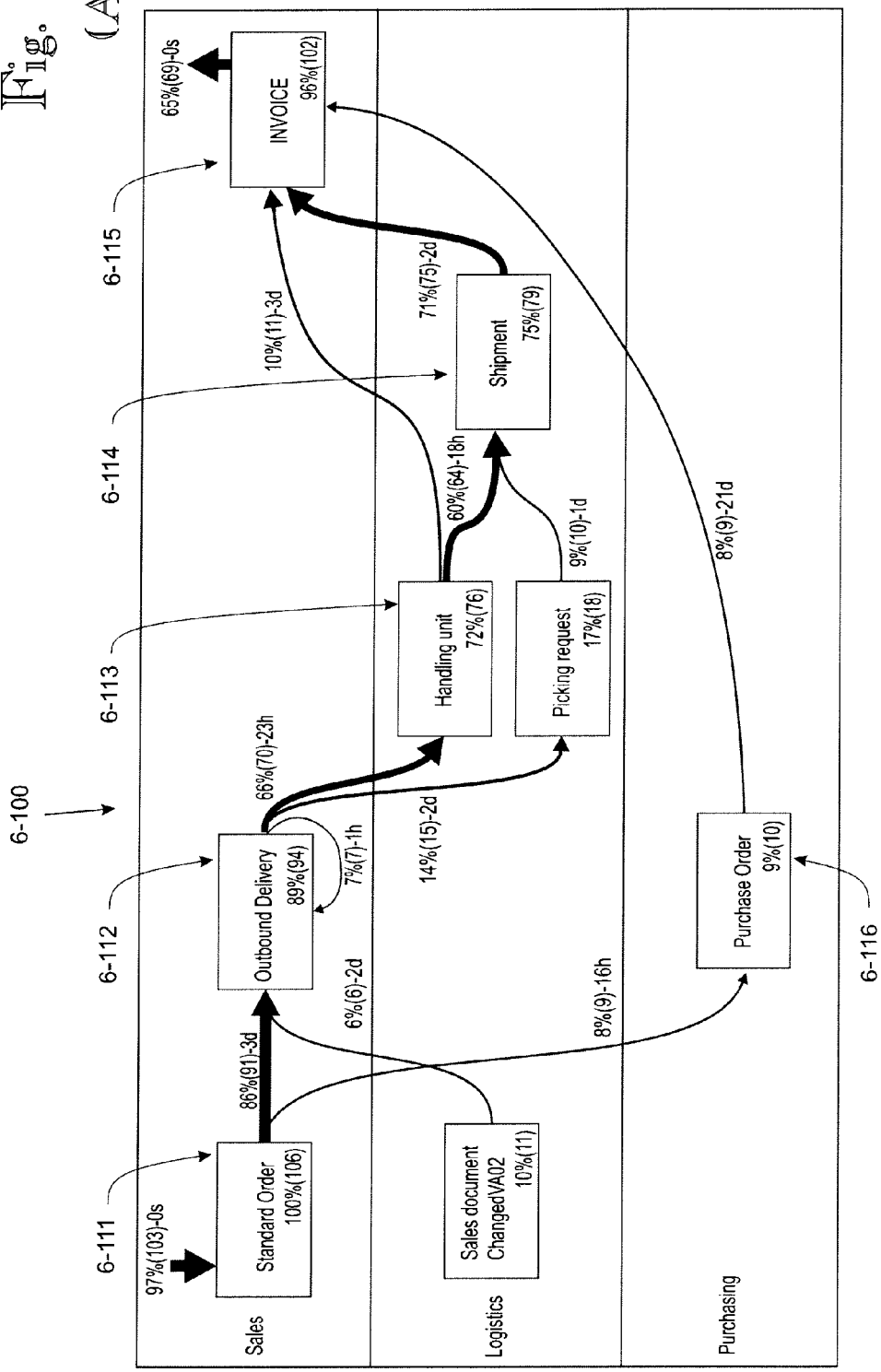
FIG. 6, which contains sub
Figure 6:
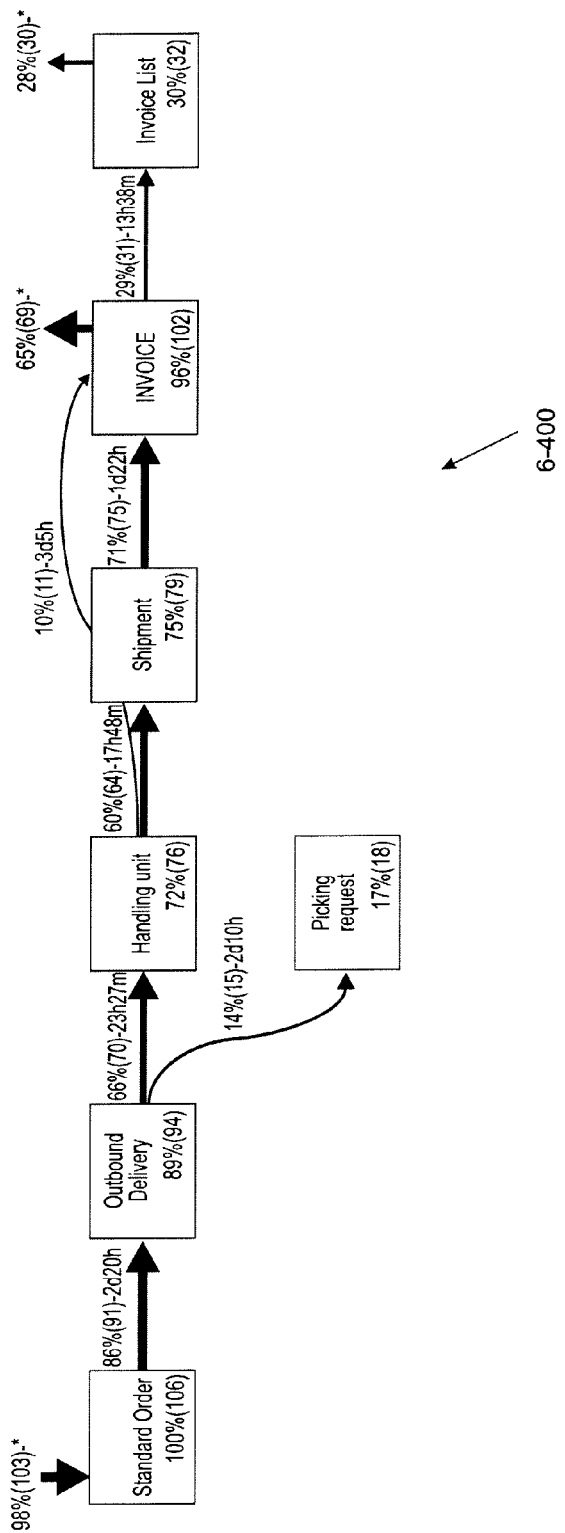
Figure 6:
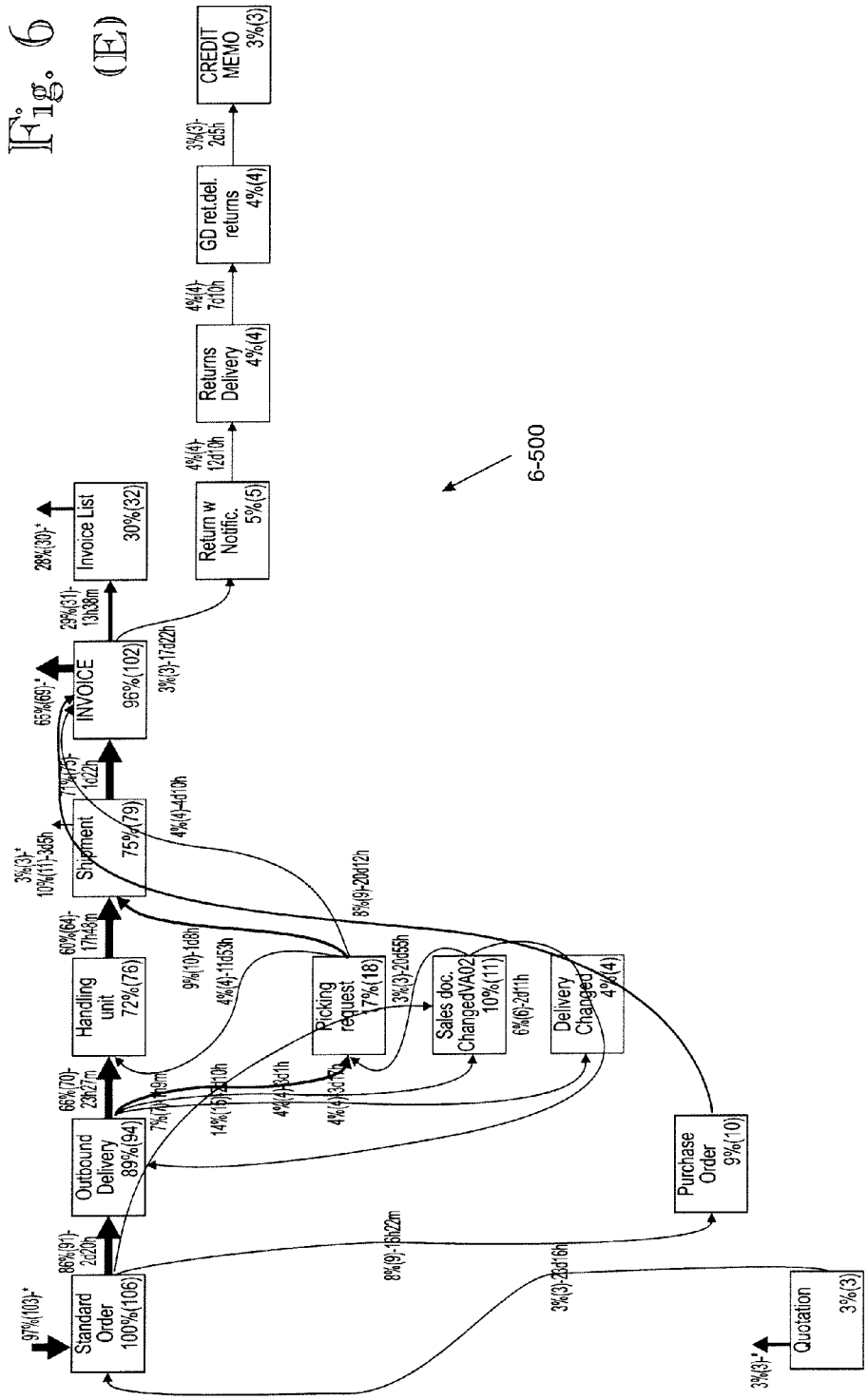

FIG. 6, which contains sub-FIGS. 6(A) through 6(*e*), shows examples of process charts of varying detail level, wherein the detail level is based on filtering out rarely-occurring process variations. FIG. 6(A) shows a self-explanatory chart 6-100 for describing process variations, which is presented by way of introduction. At this point of this patent specification, the chart 6-100 is presented as a desired goal, and a detailed description of the implementation will be provided later. The chart 6-100 provides an intuitive view into various processes in which orders from customers are processed into cash flow. The chart 6-100 intuitively shows that most processes follow the path defined by events 6-111 through 6-115. This is evident from the varying thickness of the flow arrows that connect the various events. The chart 6-100 shows event classes but not event instances, such that, say, "outbound delivery" is an event class, whereas an "outbound delivery for a specific order at a certain date/time, etc., is an event instance.

A specific reason as to why the chart 6-100 shown in FIG. 6(A) is so intuitive can be understood by comparing it with chart 6-200 shown in FIG. 6(B). The chart 6-200 shown in FIG. 6(B) shows every different process variation and every flow, wherein a process variation is defined by the chain of event types or event classes traversed by the process. In other words, if a number of process instances (each with specific order numbers, delivery dates, etc.) traverse through exactly the same event types in the same order, those process instances are said to form a process variation. The ERP system for a big company that delivers products to customers may store events in respect of millions of process instances. Each chain of event instance from order (or bid, for example) to invoicing may be considered a process. Any process instances that traverse through the same event instances at exactly the same order belong in the same process variation. The concept of process variations makes it possible to show, in a typical case, all the possible process variations on a really large computer screen or printout. Unfortunately the nature of FIG. 6(B) makes it impossible to comply with the rules for minimum character height in drawings. But the idea is not to show the legend for each event class. Instead the idea is to demonstrate the problem that showing too much detail obscures information relevant to, say, finding processing bottlenecks.

In some computer-aided design or analysis applications, zooming in and out are frequently used to find order in chaos. FIG. 6(C) shows a zoomed-in view 6-300 of a portion of the chart 6-200 shown in FIG. 6(B). Now it is easy to see why zooming in and out does not necessarily bring order into chaos: virtually all the connections (predecessor-successor relations) in the chart 6-300 begin and/or end outside the chart 6-300.

Let us now return to the question of why the chart 6-100 shown in FIG. 6(A) was so clear and intuitive. Note the two arrows leading out of event type 6-111. The wide arrow leading to event type 6-112, together with its associated legend, shows that 86% of the analyzed process instances follow the path from event type 6-111 ("standard order") to event type 6-112 ("outbound delivery"), whereas the other, narrower arrow, which leads to event type 6-116 ("purchase order") holds for 8% of the process instances. Now, 86%+8% do not add up to 100%, and 6% of the process instances have been hidden from view. Within the context of the present invention, this optional feature is called filtering. By means of filtering, it is possible to hide process variations that describe less than a certain threshold percentage of processes.

By way of example, FIGS. 6(D) and 6(E) show two more filtered sets of process variations, wherein the chart 6-400 shown in FIG. 6(D) hides process variations that account for less than 10% of the process instances, while the chart 6-500 shown in FIG. 6(E) hides process variations that account for less than 2% of the process instances. It is self-evident that the percentages (the 10% and 2%) are arbitrary values for the purposes of illustrating this embodiment of the invention. The percentage values for filtering are preferably user-settable.

Figure 7:
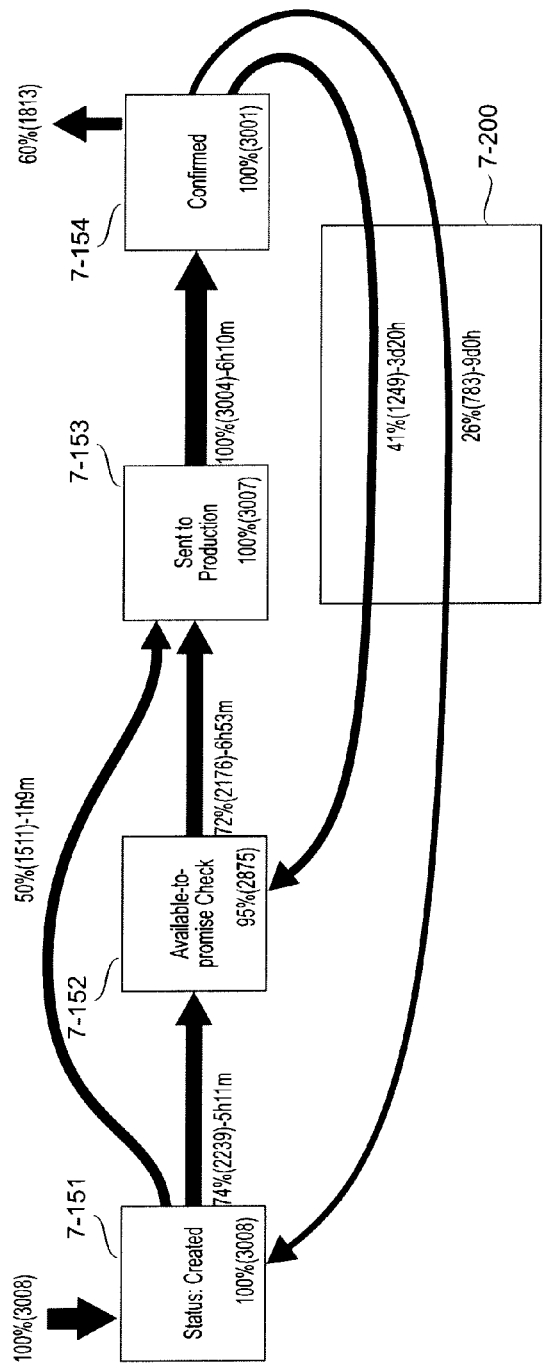
FIG. 7, which contains sub
Figure 7:
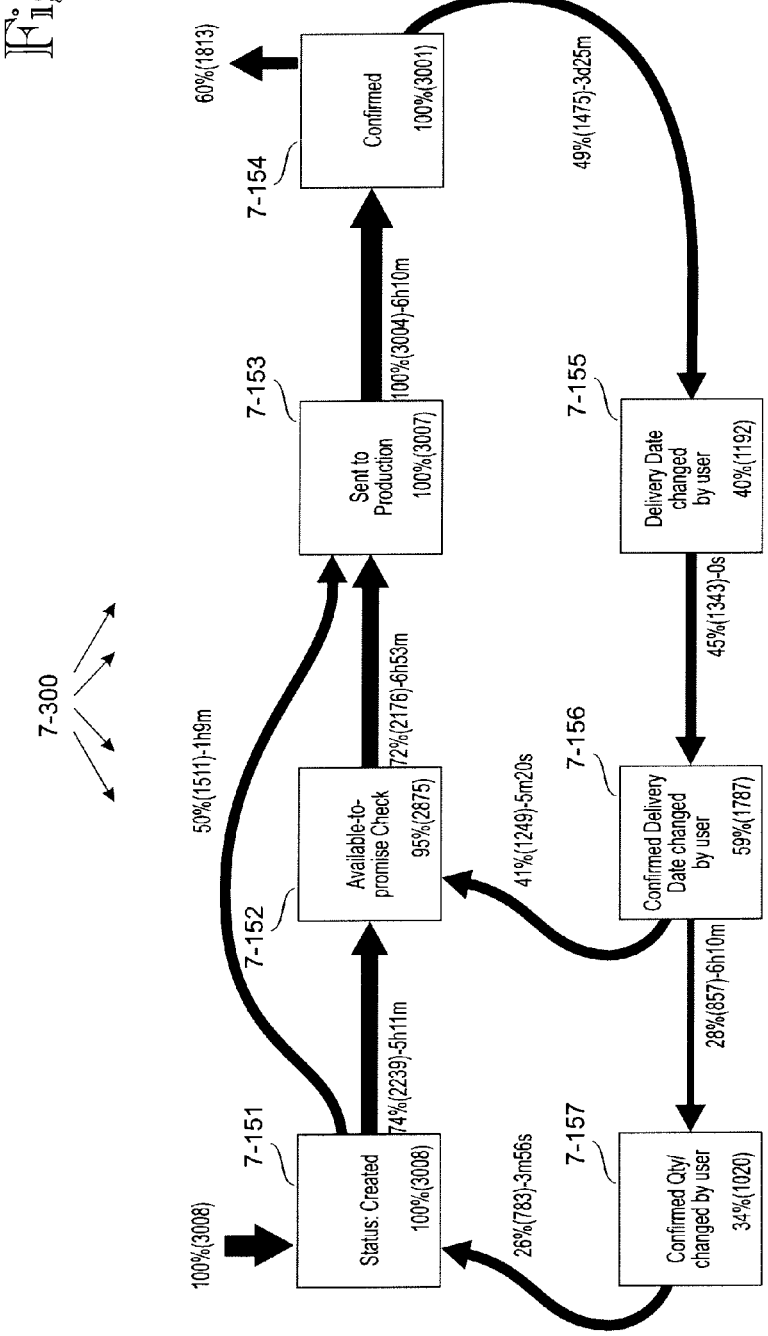

FIG. 7, which contains sub-FIGS. 7(A) through 7(C) shows how user-settable filtering may be utilized for detecting problem spots in the real-world process. As indicated by the scenario shown in FIGS. 6(B) and 6(C), mere zooming in to a specific spot in a process chart fails to identify relevant connections between events.

In FIG. 7(A), reference numeral 7-100 denotes a section of a process chart which is basically similar to the process charts shown in FIGS. 6(A) through 6(B). Reference numeral 7-150 denotes a portion of the process chart 7-100, which the user wishes to see in a zoomed-in view. That portion 7-150 is shown magnified in FIG. 7(B) and it contains four events 7-151 through 7-154. In the present scenario, the user wishes to analyse the reason for the surprisingly high percentage of backward process flows identified by the user-settable outlining frame 7-200. The user instructs the analysis system to show more detail in the portion 7-150, and the resulting view 7-300 is shown in FIG. 7(C). As shown in FIG. 7(C), the added detail level reveals three more nodes, denoted by reference numerals 7-155 through 7-157, that were hidden in the previous views. In the scenario shown in FIG. 7(C), the user of the analysis system may be able to see that the reason for the backward flows is the fact that a significant number of customers change their orders after processing of those orders has begun.

Understanding the specific reason for the backward flows is arguably in the realm of cognitive information processing and thus may be irrelevant for the present invention. Instead the present invention relates to technical questions such as how to identify and present processes, or how to provide a user interface that permits varying the detail level locally, as opposed to globally, and how to make an SQL server perform all the processing with sufficient speed for interactive process analysis.

FIG. 8(A) illustrates concepts relating to identification of processes. Reference numeral 8-100 denotes a plurality of event instance data sets. The information management system 1-200, such as an ERP system, typically stores a huge number of such event instance data sets. Each event instance data set 8-100 contains data that relates to an event instance in the logistic process 1-100. For instance, the event instance data sets 8-100 may model or control real-world event instances in the logistic process 1-100. In the exemplary case shown in FIG. 8(A), the event instance data sets 8-100 describe corresponding real-world event instances by specifying what happened (or is to happen), when did/will the event instance start or end, what is the location, state or phase of a resource at the origin and destination of the event instance, etc. Such description data for the real-world event instances are collectively denoted by reference numeral 8-110.

Reference numeral 8-150 denotes a process identified by a process identifier. As briefly stated in the introductory section of this patent specification, it is well known to use computer-implemented analysis tools to find opportunities for improving the efficiency of real-world processes. As regards the present invention, one of the problems relates to the fact that the computer-implemented analysis system may not be directly connectable to the real-world process 1-100, and the ERP system 1-200 or other information management system that supports the real-world process 1-100 may not explicitly identify any real-world "processes". In a typical case, the ERP system 1-200 may store identifiers for orders placed by customers, whereas the company that fulfils the orders might be interested in improving the efficiency of a manufacturing apparatus or delivery vehicle. It is thus evident that the order number assigned for the customer's order is generally insufficient for identifying "processes" in a manner which could yield meaningful data for improving the efficiency of physical processes. Accordingly, the analysis system 1-300 is preferably able to form explicit process identifiers based on information contained in the event instance data sets 8-100. Reference numeral 8-120 denotes an exemplary process identifier, which the process analysis system 1-300 forms on the basis of the description data 8-100. All event instance data sets 8-100 having a process identifier thus belong in the same process, although the definition of "process" may be altered dynamically, depending on which kinds of processes are being analysed.

In any real-world processes for which it makes sense to establish a computer-implemented analysis system, the number of individual events and processes is huge. It is therefore desirable to apply some kind of a generalization scheme to find patterns which are typical for specific kinds of events and processes. According to an embodiment of the invention, the process analysis system is capable of generalizing event instances 8-100 to event types 8-200 by utilizing only a subset 8-210 of the description data 8-110. In an illustrative example, the subset 8-210 of description data that identifies an event type (as opposed to event instance) only contains a descriptor of what happened in the event. For example, the event descriptor 8-210 may indicate that the event type is a delivery of an order but ignore the details of the order.

In some embodiments, identification of processes may utilize external data 8-300, which is data other than event data. A data item in the external data 8-300 may describe other items of external data, event instances 8-100 or processes 8-150.

In some implementations the server may create and store a view 8-400 for each filtered set of the event instance data sets. The stored view includes at least information indicating which event instance data sets are included or excluded from the analysis. Each view may be used to create specific analysis result sets and specific presentations of analysis. In short, the view describes what information elements to include (or exclude), based on which criteria and, optionally, various analysis parameters which may specify how to combine or otherwise use information from the event instance data sets. For instance, such use of information may involve computing a weighted cost function, wherein cost indicates consumption of one or more resources, monetary or otherwise.

In a further embodiment of the invention, the process analysis system is capable of detecting and analysing process variations. As used herein, a process variation is defined as an ordered series of events (as classes, not as instances). In other words, all processes having exactly the same events in exactly the same order belong in the same process variation 8-250. Process variations will be discussed in detail in connection with FIG. 9.

FIG. 8(B) illustrates flow instance and flow instance type. As shown in FIG. 8(B), a flow instance 8-500 means a transition between two event instances, denoted herein by reference numbers 8-100$_1$ and 8-100$_2$. Correspondingly, a flow instance type 8-550 means a transition between two event types 8-200$_1$ and 8-200$_2$.

The relation between the information elements shown in FIGS. 2 and 8(A)-(B) is as follows. The process analysis database PA-DB coupled to the server PA-S contains all the information shown in FIG. 8(A)-(B). Based on some initial request the server PA-S forms an analysis result set (shown as step 2-300) and sends it to the client PA-C (step 2-310). The client presents an analysis based on the analysis result set (step 2-320) and based in an input relating to the analysis, sends a request to the server PA-S (step 3-330). Based on the request, the server PA-S then forms filtered versions of the information shown in FIG. 8(A)-(B), including the event instance data sets, sends a revised analysis result set to the client, and the client presents a revised analysis.

Figure 9:
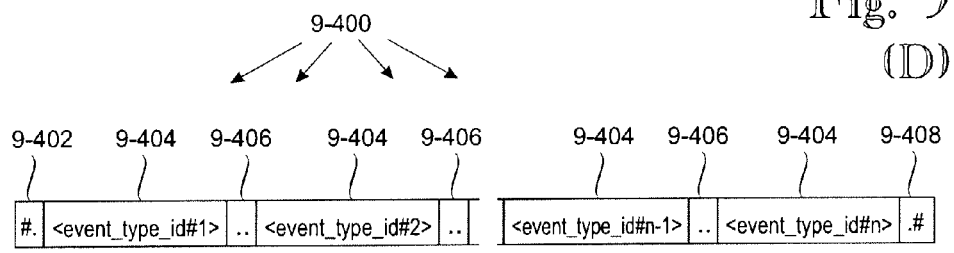
FIG. 9, which contains sub

FIG. 9, which contains sub-FIGS. 9(A) through 9(E), illustrates the concept and use of process variations. As briefly stated in connection with FIG. 8(A), a process variation is defined as an ordered series of events (as classes or event types, not as event instances). In other words, all processes having exactly the same events in exactly the same order belong in the same process variation. Reference numeral 9-100 denotes an exemplary SQL table definition for a variation-table containing all the process variations transferred from the information management system 1-200 to the process analysis system 1-300. Reference numeral 9-200 denotes an exemplary SQL table definition for a process instance table. In the drawings, "case" is used as a shorthand notation for process instance. The process instance table according to the definition 9-200 is referenced by the event-table and has a foreign key to the variation table.

FIG. 9(C) shows a flow chart for an algorithm to be processed whenever new events are added to the database. Firstly, all unique case identifiers (process instance identifiers) are collected for all imported events (9-302). Next, the algorithm queries a list of event type identifiers visited by the process instance, and the events returned by the query are sorted by the their time stamps (9-304). Then the process analysis system creates an easily searchable representation of this event type (9-306). The reason for creating an easily searchable representation of the event types is that the representation of the event types should be searchable by the SQL server of the process analysis system 1-300 (item PA-S in FIG. 2). An illustrative example of an easily searchable representation of the event types will be shown in connection with FIG. 9(D). Next, the process analysis system checks if a process variation with an identical event type paths already exists (9-308). If not, the algorithm proceeds to creating a new variation, which is selected as the variation of the process instance (9-310). On the other hand, if a process variation with an identical event type paths already exists, it will be selected as the variation of the process instance (9-312). The preceding steps starting from 9-304 are repeated until all selected process instances have been processed.

FIG. 9(D) shows an illustrative but non-restrictive example of an easily searchable representation of the event types. The representation of the event types is generally called a "path" and denoted by reference numeral 9-400. The path 9-400 comprises a path start 9-402, an event type identifier 9-404 for the event type of each event in the process, and a path end 9-408. Between any two event type identifiers, there is a separator 9-406. The symbols for the path start 9-402, separator 9-406, and path end 9-408 must not be used in the event type identifiers 9-404. A benefit of a textual representation of the path (chain of event type identifiers for the event instances of a process instance) is that the paths are easily processed by SQL servers. It is self-evident that as long as these criteria are met, there is a virtually endless variety of suitable textual symbols. The path 9-400 is an exemplary representation of process variations, although other representations may be used as well.

FIG. 9(E) shows an illustrative example of a query which can be processed by an SQL server. Specifically, the SQL script denoted by reference numeral 9-500 finds the most common process variation (chain of event type identifiers for a process instance). As stated earlier, a benefit of the above-described features is that the queries can be processed by the SQL server of the process analysis system 1-300 (item PA-S in FIG. 2), which is why the communication links between the clients and the SQL server will not constitute a bottleneck. If the above-described features are not used, implementation of the corresponding queries will much more complicated and it is not easy to see how processing could be performed entirely in the SQL server of the process analysis system.

FIG. 10 illustrates the concept of the causal model 10-100, which is a key feature in the fifth feature set and an optional feature in other feature sets. Arrows 10-102 and 10-104 illustrate the fact that the causal model 10-100 includes or is based on the event data 8-200 and external data 8-300 respectively. Arrow 10-106 illustrates how one event type $8\text{-}200_1$ influences another event type $8\text{-}200_2$, and such mutual influence relations between event types is stored in and utilized by the causal model 1-100. Arrow 10-108 illustrates the fact that in some implementations the causal model 10-100 is able to predict probabilities for alternative outcomes in a sequence of events generally denoted by reference numeral 10-200. In the example shown, event En, for which there are m possible outcomes, has a sequence of k prior events (events En-k through En-1). The m possible outcomes for event En are denoted $En_1$ through $En_m$. Based on the causal model 10-100, including the statistical frequencies of the event instances, the server PA-S is able to compute probabilities $P(En_1)$ through $P(En_m)$ for the respective outcomes $En_1$ through $En_m$ for the next event En, assuming that the event En is preceded by the sequence of k prior events En-k through En-1. In some implementations the creation of causal model includes usage of advanced data mining algorithms or neural networks.

It will be apparent to a person skilled in the art that, as the technology advances, the inventive concept can be implemented in various ways. The invention and its embodiments are not limited to the examples described above but may vary within the scope of the claims.

We claim:

1. A method for analyzing information derived from event data by a computer-implemented analysis system, which comprises a server and one or more clients, wherein the method comprising the following acts performed by the server:
   importing event instance data comprising a plurality of event instance data sets from at least one information management system, wherein each event instance data set comprises one or more attributes describing an event instance in the real-world process, wherein the event data describes a real-world process the execution of which is supported by the at least one information management system but the real-world process is not directly connectable with the computer-implemented analysis system;
   determining for each imported event instance data set a corresponding process instance based on at least the attributes of the imported event instance data set;
   determining at least one event order attribute for each imported event instance data set based on other event instance data sets corresponding to the same process instance;
   calculating order information for each event instance data set so that for each event instance data set, an unambiguous and unique predecessor event and successor event can be deduced based on at least the event order attribute and process instance;
   determining at least one event type attribute for each imported event instance data set based on at least the attributes of event instance data sets;
   whereby the process instances can be determined and the order information can be calculated regardless of whether a schema describing the real-word process is available;
   forming an analysis result set based on at least some of the event instance data sets and the at least one event order attribute;
   sending the analysis result set to one or more clients;
   wherein the method further comprises:
   at the one or more clients, presenting an analysis utilizing the analysis result set.

2. The method of claim 1, further comprising preprocessing the events instance data sets to be imported in such a manner that each imported event instance data set contains at least one unambiguous timestamp value.

3. The method of claim 1, further comprising splitting an event instance data set to be imported, which indicates multiple timestamp values, to a plurality of separate event instance data sets, each of which indicates a single timestamp value.

4. The method of claim 1, wherein the acts performed by the server further comprise determining a set of flow instances so that for each two consecutive event instance data sets for any process instance, a flow instance is determined such that each flow instance has a link to a unique predecessor event instance and a unique successor event instance, wherein the predecessor event instance or successor event instance for the first or last flow instance, respectively, may be empty.

5. The method of claim 4, wherein the acts performed by the server further comprise:
   determining at least one event type attribute for each imported event instance data set based on at least the attributes of event instance data sets; and
   determining at least one flow instance type for each flow instance based on the event types of the predecessor and successor event instances of the flow instance, and each flow instance type uniquely determines the event types of the predecessor and successor events of the flow instance; and
   using the flow instance type in forming the analysis.

6. The method of claim 5, wherein the imported event instance data comprises external data that further describes characteristics of one or more of the following: the event instance data sets, process instances, event types and flow instance types.

7. The method of claim 6, further comprising using the external data to form new event instance data sets related to process instances.

8. The method of claim 6, further comprising using the external data to form new event instance data sets related to process instances.

9. The method of claim 5, wherein the imported event instance data comprises external data that further describes characteristics of the flow instance types.

10. The method of claim 1, further comprising calculating at least one weighted average cost attribute for at least one event type based on at least the event instance data sets.

11. The method of claim 1, wherein the step of sending the analysis result set to the one or more clients is initiated by the server based on at least the analysis results.

12. The method of claim 1, wherein the imported event instance data comprises external data that further describes characteristics of the event instance data sets.

13. The method of claim 1, wherein the imported event instance data comprises external data that further describes characteristics of the process instances.

14. The method of claim 1, wherein the imported event instance data comprises external data that further describes characteristics the event types.

15. The method of claim 1, further comprising:
at the one or more clients, in response to receiving an input that is related to the presented analysis, sending a request to the server;
the server forming filtered event instance data by excluding event instance data sets from the analysis based on the input received from the one or more clients;
repeating at least the above steps of determining the at least one event order attribute, forming the analysis result set, sending the analysis result set and presenting a revised analysis based on at least the filtered event instance data.

16. The method of claim 1, further comprising: the server storing the calculated order information, wherein for every event instance data set, the stored information indicates at least the calculated order information and a database id for the successor or predecessor event instance data set.

17. The method of claim 16, further comprising: the server storing the calculated order information, wherein for each event instance the stored order information includes at least one attribute value copied from the successor event for the timestamp of the event or event type or the event.

18. The method of claim 16, further comprising: the server using previously stored order information for calculating new order information for a new analysis based on a new set of event instance data sets.

19. The method of claim 1, further comprising: the server creating and storing a view for each filtered set of the event instance data sets, wherein the stored view includes at least information indicating which event instance data sets are included or excluded from the analysis.

20. The method of claim 19, wherein the stored view includes analysis parameters usable for recreating a specific analysis result.

21. The method of claim 19, wherein one or more additional attributes are stored for the stored view, the one or more additional attributes indicating one or more of the following: access rights to the stored view for one or more users, descriptive information for the view, results relating to user voting for rating of the view and user comments relating to the view.

22. The method of claim 19, further comprising: the server storing a criterion for at least one view wherein, if the criterion is triggered by importing at least one new event instance data set, the server initiates an action specified for the criterion.

23. A computer-implemented analysis system comprising a server for supporting one or more clients, the server comprising:
at least one processing unit;
memory for storing applications and data;
wherein the memory comprises program code instructions for instructing the at least one processing unit to carry out the following steps:
importing event instance data comprising a plurality of event instance data sets from at least one information management system, wherein each event instance data set comprises one or more attributes describing an event instance in the real-world process, wherein the event instance data describes a real-world process the execution of which is supported by the at least one information management system but the real-world process is not directly connectable with the computer-implemented analysis system;
determining for each imported event instance data set a corresponding process instance based on at least the attributes of the imported event instance data set;
determining at least one event order attribute for each imported event instance data set based on other event instance data sets corresponding to the same process instance;
calculating order information for each event instance data set so that for each event instance data set, an unambiguous and unique predecessor event and successor event can be deduced based on at least the event order attribute and process instance;
determining at least one event type attribute for each imported event instance data set based on at least the attributes of event instance data sets;
whereby the process instances can be determined and the order information can be calculated regardless of whether a schema describing the real-word process is available;
forming an analysis result set based on at least some of the event instance data sets and the at least one event order attribute;
sending the analysis result set to one or more clients.

24. The computer-implemented analysis system of claim 23, wherein the server comprises multiple processing units and a load-balancing unit for distributing processing load among the multiple processing units.

25. A computer-readable memory comprising program code instructions for a server of a process analysis system that also comprises one or more clients, wherein the program code instructions, when executed by the server, cause the server to perform the steps of:
importing event instance data comprising a plurality of event instance data sets from at least one information management system, wherein each event instance data set comprises one or more attributes describing an event instance in the real-world process, wherein the event instance data describes a real-world process the execution of which is supported by the at least one information management system but the real-world process is not directly connectable with the computer-implemented analysis system;
determining for each imported event instance data set a corresponding process instance based on at least the attributes of the imported event instance data set;
determining at least one event order attribute for each imported event instance data set based on other event instance data sets corresponding to the same process instance;
calculating order information for each event instance data set so that for each event instance data set, an unambiguous and unique predecessor event and successor event can be deduced based on at least the event order attribute and process instance;
determining at least one event type attribute for each imported event instance data set based on at least the attributes of event instance data sets;
whereby the process instances can be determined and the order information can be calculated regardless of whether a schema describing the real-word process is available;
forming an analysis result set based on at least some of the event instance data sets and the at least one event order attribute;

sending the analysis result set to one or more clients, whereby the one or more clients are able to presenting an analysis utilizing the analysis result set.

\* \* \* \* \*